(12) United States Patent
Speas

(10) Patent No.: US 6,699,161 B1
(45) Date of Patent: Mar. 2, 2004

(54) ADJUSTABLE PEDAL DRIVE MECHANISM

(76) Inventor: Danny E. Speas, P.O. Box 715, Haiku, HI (US) 96708

( * ) Notice: Subject to any disclaimer, the term of this patent is extended or adjusted under 35 U.S.C. 154(b) by 320 days.

(21) Appl. No.: 09/709,524

(22) Filed: Nov. 13, 2000

Related U.S. Application Data

(63) Continuation-in-part of application No. 09/208,276, filed on Dec. 9, 1998, now Pat. No. 6,371,891.

(51) Int. Cl.⁷ ............................................. A63B 22/06
(52) U.S. Cl. ............................. 482/61; 482/51; 482/57; 74/594.1; 280/210; 280/236
(58) Field of Search .............................. 482/51, 57–59, 482/60–63; 74/130, 138, 594.1, 594.2; 280/210, 214, 220, 221, 223, 236, 255, 259, 260, 261

(56) References Cited

U.S. PATENT DOCUMENTS

| | | | | |
|---|---|---|---|---|
| 592,093 A | * | 10/1897 | Law ............................. | 272/73 |
| 3,572,699 A | * | 3/1971 | Nies ............................. | 272/73 |
| 3,888,512 A | * | 6/1975 | Peterson ..................... | 280/255 |
| 4,019,230 A | | 4/1977 | Pollard | |
| 4,077,648 A | | 3/1978 | Seul | |
| 4,564,206 A | | 1/1986 | Lenhardt | |
| 4,574,649 A | | 3/1986 | Seol | |
| 4,961,570 A | | 10/1990 | Chang | |
| 5,121,654 A | * | 6/1992 | Fasce ........................ | 74/594.2 |
| 5,351,575 A | | 10/1994 | Overby | |
| 5,569,128 A | * | 10/1996 | Dalebout ..................... | 482/57 |
| 6,383,108 B1 | * | 5/2002 | Yoo ............................. | 475/12 |

FOREIGN PATENT DOCUMENTS

| | | |
|---|---|---|
| CA | 923517 | 3/1973 |
| EP | 297579 | 1/1989 |
| GB | 610936 | 10/1948 |
| GB | 667655 | 3/1952 |

* cited by examiner

Primary Examiner—Nicholas D. Lucchesi
Assistant Examiner—Tam Nguyen
(74) Attorney, Agent, or Firm—Litman Law Offices

(57) ABSTRACT

An adjustable pedal drive mechanism for bicycles and exercise machines includes a pedal arm attachment plate assembly on each side of the cycle or machine frame. Each plate assembly provides adjustment of the pivotally attached pedal arm, for altering its arcuate travel path and limits. Each pedal arm and plate includes a mechanism for infinitesimally adjusting the corresponding tension member (cable, chain, etc.) to predetermined positional limits, for altering the system's mechanical advantage. The mechanical ratios of each pedal arm are independently adjustable by handlebar controls. The tension member is reciprocated back and forth with corresponding strokes of the corresponding pedal arm, producing rotary force to the rear wheel with each pedal stroke. The rear wheel sprockets/pulleys drive one way mechanisms (ratchets, cam and roller, etc.) on the rear wheel hub. A stationary stand may be provided for a bicycle incorporating the mechanism, for use as an exercise machine.

86 Claims, 15 Drawing Sheets

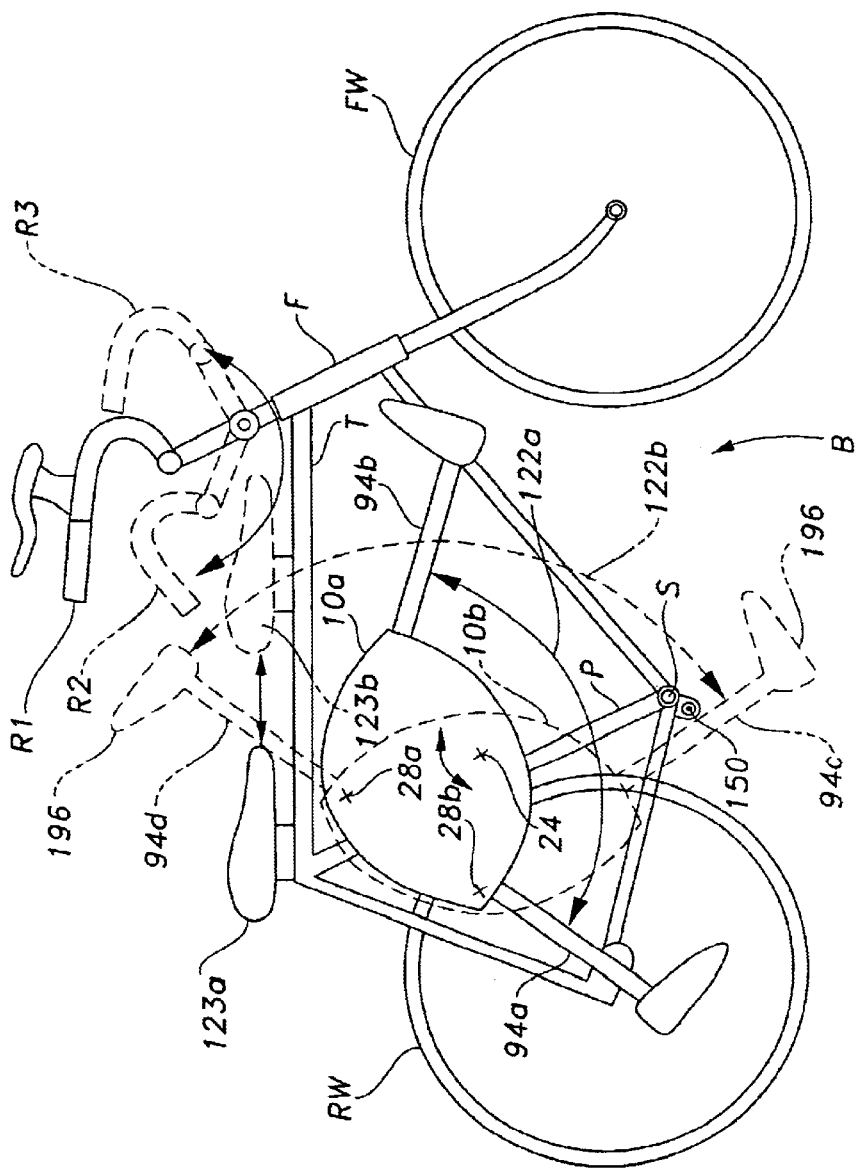

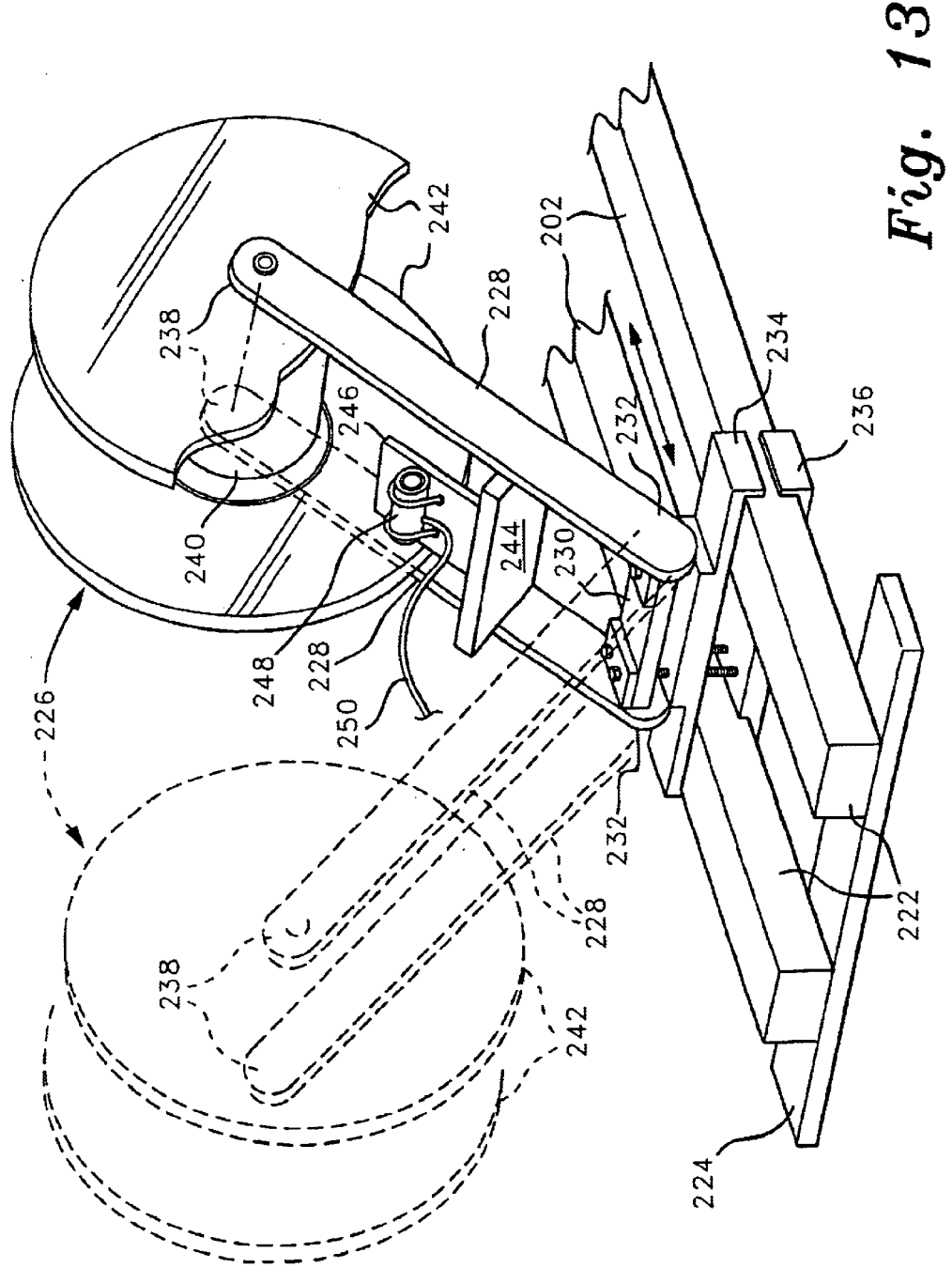

ADJUSTABLE PEDAL DRIVE MECHANISM

REFERENCE TO RELATED PATENT APPLICATION

This application is a continuation in part of U.S. Patent application Ser. No. 09/208,276, filed on Dec. 9, 1998, now U.S. Pat. No. 6,371,891.

BACKGROUND OF THE INVENTION

1. Field of the Invention

The present invention relates generally to pedal mechanisms for powering machinery, and more specifically to an infinitesimally adjustable reciprocating pedal drive mechanism for powering a mobile vehicle or stationary device, such as a bicycle or exercise bicycle. The present mechanism allows the stroke of each pedal to be adjusted, as well as providing for the adjustment of the effective gear ratios of the pedal mechanism as desired. A stand for supporting a bicycle equipped with the present pedal drive mechanism, enabling the bicycle to be used as an exercise bike, is also provided.

2. Description of the Related Art

The so-called "safety bicycle," incorporating front and rear wheels of generally equal diameters and a pedal mechanism including an increase in the effective drive ratio between pedals and drive wheel, was considered a significant advance in the bicycle industry when it was developed in the late nineteenth century. This mechanism provided the speed desired, without necessitating an extremely large drive wheel with its accompanying direct pedal drive, as in the "ordinary" type of bicycle.

However, it has long been recognized that additional improvements in the pedal and chain sprocket drive mechanism of the conventional bicycle, are desirable. For one thing, the circular motion of the pedals in a conventional bicycle pedal drive mechanism are not optimally efficient for receiving power from the generally reciprocating motion provided by the legs of a rider. Another problem is the provision of finite gear ratios in such bicycles, which cannot provide optimum ratios under every circumstance. Even where those ratios are close to optimum, such geared bicycles cannot provide variable pedal positions to optimize the leg thrust or force of a rider, nor can they vary the pedal stroke in order to optimize the leg force further. This is true for both mobile bicycles and also for stationary exercise bicycles or exercise mechanisms using a pedal-like arrangement.

Accordingly, a need will be seen for an adjustable pedal mechanism for mobile and stationary vehicles, particularly for bicycles and the like. The mechanism must provide a reciprocating action for the pedals, in order to simulate more closely the natural reciprocating action of the legs of an individual while walking or running. Moreover, the mechanism must provide for the adjustment of the pedal stroke as required, as well as for positioning the mechanism at least arcuately as desired to further optimize the energy of the rider. Finally, the mechanism must also provide an infinitesimally adjustable ratio in order to optimize the energy of the rider even further.

A discussion of the related art of which the present inventor is aware, and its differences and distinctions from the present invention, is provided below.

U.S. Pat. No. 4,019,230 issued on Apr. 26, 1977 to Melville R. Pollard, titled "Reciprocating Powered Bicycle," describes a bicycle having conventional drive and driven sprockets with a continuously rotating chain extending therearound. However, the pedal arms are not affixed to the drive sprocket, but rather are affixed to ratchet mechanisms which in turn drive the drive sprocket in only one direction of rotation. The two pedal arms are linked together by a bellcrank mechanism, so that when one pedal is descending, the other is forced to rise. The ratchet mechanism may be locked to provide for conventional circular pedal operation, if so desired. Pollard has only a conventional Derailleur mechanism having only a finite number of ratios, unlike the infinitesimally adjustable mechanism of the present invention. Also, Pollard does not provide any means of adjusting the position of the pedal swing, due to the fixed length and location of the interconnecting bellcrank. Such pedal swing is incrementally adjustable in the present mechanism. Finally, the Pollard pedal arms pivot about the conventional sprocket hub of the bicycle, while the pivot points for the pedal arms of the present mechanism are located on pivotally adjustable plates for adjusting the pedal arm swing.

U.S. Pat. No. 4,077,648 issued on Mar. 7, 1978 to Man Taik Seul, titled "Bicycle Propulsion And Speed Change Means," describes a bicycle drive system incorporating opposite reciprocating pedal arms which pivot about a point on the rear frame essentially above the rear wheel hub. Each of the two pedal arms are connected to a drive wheel by two arms, with the length of the arms being remotely and incrementally adjustable to adjust the effective drive ratio by a series of finite increments. The drive wheel turns a sprocket, which is in turn ratcheted to impart driving force to the drive wheel of the bicycle. Seul does not provide any means of adjusting the swing arc of the pedals to a different position, nor any infinitesimally adjustable ratio means, as in the present drivel mechanism. Moreover, the Seul pedal arms pivot about a fixed point on the frame of the bicycle, unlike the adjustably positionable pedal arm pivot points of the present invention.

U.S. Pat. No. 4,564,206 issued on Jan. 14, 1986 to Larry G. Lenhardt, titled "Pedal Drive," describes a mechanism having a relatively large diameter primary sprocket and a smaller diameter secondary sprocket, both rotating at the same speed. A multiple link arrangement connects the two pedal arms with the two sprockets. The resulting pedal travel path is a relatively narrow and elongate kidney-shaped path, generally resembling a reciprocating arc. However, Lenhardt utilizes a conventional Derailleur mechanism having only a finite number of different ratios, unlike the present invention. Also, Lenhardt does not provide any means for altering the travel path of the pedals, as provided in the present invention. Moreover, while the Lenhardt pedal arms do not pivot about the sprocket hub axis, they are not adjustably positionable, as in the present invention.

U.S. Pat. No. 4,574,649 issued on Mar. 11, 1986 to Man T. Seol, titled "Propulsion And Speed Change Mechanism For Lever Propelled Bicycles," describes a rocking pedal action in which each pedal arm is connected to a relatively short length of chain which wraps about a respective sprocket disposed to that side of the drive wheel hub. Each hub contains a cam and roller one way drive device therein. The two chain lengths are connected by a cable, so that when one chain is rotating in a driving direction about its respective sprocket, the opposite chain is being pulled in the opposite direction and free wheels due to the release of the cam and roller mechanism on that side. Seol provides only incremental adjustment of the mechanical ratios of his mechanism, unlike the infinitesimal mechanical ratio adjustment of the present invention. Moreover, the arcuate motion of each pedal arm is fixed and cannot be adjusted using the Seol mechanism, whereas the present mechanism provides such adjustment as desired. The pivot axis of the pedal arms is through the original sprocket hub and is not adjustably positionable, while the pedal arm pivots are adjustably positioned away from the conventional sprocket hub in the present invention.

U.S. Pat. No. 4,961,570 issued on Oct. 9, 1990 to Chester Chang, titled "Exercising Mechanism For Simulating Climbing A Ladder," describes a device in which the two opposite pedal arms are pivotally secured at their distal ends to the frame of the machine. Relatively short cranks connecting the arms to a rotary drive wheel result in a reciprocating action of the pedal arms for rotating the wheel. A series of speed increasing gears results in the relatively high speed rotation of an output wheel, with the is mechanical disadvantage provided by the speed increase resulting in a requirement for a relatively large force at each pedal in order to produce sufficient force for rotating the output wheel. Chang does not disclose any means of adjusting the arcuate pedal movement nor of adjusting the effective gear ratios, as provided by the present invention. The Chang pedal arms pivot about a fixed position on the frame of the device and cannot be adjusted, as provided by the present mechanism.

U.S. Pat. No. 5,121,654 issued on Jun. 16, 1992 to Hector G. Fasce, titled "Propulsion And Transmission Mechanism For Bicycles, Similar Vehicles And Exercise Apparatus," describes a mechanism somewhat resembling that of the Seol '649 U.S. Patent discussed further above. Fasce uses a pair of arcuate chain guides extending from each pedal, with the arcuate path of each guide increasing the length of respective chain travel as the respective pedal is reciprocated through its arc of travel. Springs urge the chain guides and pedals in an upwardly extended direction. The drive hub has two one way clutches, with each clutch freewheeling in the direction of rotation opposite the drive direction. No disclosure is made of any ratio adjusting means or means of adjusting the path of travel of the pedals, which features are provided in the present invention. Moreover, the Fasce pedal arms pivot about the fixed sprocket hub of the bicycle, unlike the variably positionable pedal arm pivots of the present invention.

U.S. Pat. No. 5,351,575 issued on Oct. 4, 1994 to Nathan Overby, titled "Pumping Propulsion System," describes a pedal system using a cam and roller one way drive mechanism for each pedal, allowing each pedal to be pumped downwardly to turn the pedal sprocket. A spring is used to draw each pedal upwardly after each down stroke, with a telescoping cylinder provided as a guard over each spring. Overby notes a conventional Derailleur type gear change mechanism at the rear sprocket for his bicycle, but does not describe any form of infinitesimally adjustable ratios or any means of changing the pedal geometry or positioning, as provided by the present invention. The Overby pedal arms pivot about the fixed location of the original sprocket hub, unlike the variably positionable pedal arm pivot points of the present invention.

British Patent Publication No. 610,936 accepted on Oct. 22, 1948 to Mads Kruse, titled "Improvements In Or Relating To Driving Mechanism For Velocipedes," describes a reciprocating pedal arrangement, with the pedals each pulling on a chain or the like which in turn rotates a one way, cam and roller drive sprocket. The "tension member" (chain, etc.) attachment to each of the pedals is adjustable along the length of each pedal, effectively allowing for the adjustment of the "gear ratio" of the bicycle. However, no adjustment of the pedal geometry or positioning is provided by Kruse, as is provided by the present mechanism. Also, the pedal arm pivot points of the Kruse mechanism are through the fixed sprocket hub, unlike the variably positionable pedal arm pivot points of the present invention.

British Patent Publication No. 667,655 published on Mar. 5, 1952 to Andre L. Havet, titled "Hub For Bicycles Controlled Through Reciprocating Pedalling And Allowing Forward And Rearward Freewheeling," describes a one way, ratcheting type hub mechanism for bicycles. No pedal drive mechanism or adjustment therefor, or adjustable gear ratio means is disclosed by Havet, each of which features is a part of the present invention.

Canadian Patent Publication No. 923,517 issued on Mar. 27, 1973 to George Kay et al., titled "Exercising Machine," describes a device having reciprocating foot pedals and cable mechanisms for pulling with the hands and arms. The pedal pivot points are at a fixed location, unlike the adjustable pivot points of the present mechanism, and no adjustable gear ratio means is provided by Kay et al. with their mechanism, as provided in the present invention. Also, Kay et al. do not provide any means of securing a bicycle incorporating an adjustable pedal drive mechanism to their exercise machine, as provided by an embodiment of the present invention.

Finally, European Patent Publication No. 297,579 published on Jan. 4, 1989 to Georg Felkel illustrates a pedal powered drive mechanism for a vehicle. The system appears to use a one way drive (ratchet, etc.) and reciprocates a chain about the drive sprocket by means of a multiple pulley or sprocket system, similar to that used in a block and tackle. No adjustable pedal pivot points are apparent in the Felkel disclosure.

None of the above inventions and patents, either singly or in combination, is seen to describe the instant invention as claimed.

SUMMARY OF THE INVENTION

The present invention comprises an adjustable pedal drive mechanism for use with bicycles, exercise machines, and other vehicles and devices which may be pedal powered. A stand for using a bicycle equipped with the present pedal mechanism as an exercise machine, is also disclosed. The present pedal mechanism essentially comprises a pair of plates which are pivotally secured through a lateral passage affixed to the diagonal frame member approximately midway therealong, with a relatively long pedal arm pivotally mounted to each of the plates. Each plate is adjustable relative to the frame of the bicycle, to allow the pedal swing, geometry, or travel arc or range to be adjusted as desired.

A tension member (chain, cable, etc.) is provided on each side of the assembly for independent operation of the two pedal arms, and extends around a pair of sprockets on each pedal arm for greater travel of the tension members for a given stroke of the pedal arms. Each pedal arm includes means for infinitesimally adjusting the contact position of a chain, cable, or the like thereto, for adjusting the effective mechanical ratio of the mechanism. Each of these tension members (chain, cable, etc.) passes about another mechanical ratio adjusting device secured to each of the plates, thence continuing to the rear wheel drive sprocket of the bicycle. An idler pulley is provided for each tension member to reverse its relative direction of motion according to pedal arm movement. The rear wheel sprocket includes two one way clutch mechanisms on each side, thus producing a rotational force to the rear wheel in only a forward rotational direction with both directions of travel of each arcuately reciprocating pedal arm. These one way clutches may be ratchets, cam and roller mechanisms, etc., as desired.

Accordingly, it is a principal object of the invention to provide an improved adjustable pedal drive mechanism for pedal powered devices, including bicycles and exercise machines.

It is another object of the invention to provide an improved pedal mechanism for such devices, which mechanism provides means for collectively adjusting the pivot point and travel path of the pedals of the mechanism as desired.

It is a further object of the invention to provide an improved pedal mechanism including means for infinitesimally adjusting the effective mechanical ratio of the device through a predetermined range of mechanical ratios, as desired.

An additional object of the invention is to provide an improved pedal mechanism including means for independently adjusting the effective ratio of each of the pedals and pedal arms independently of the other, as desired.

Still another object of the invention is to provide an improved pedal mechanism providing for the adjustment of effective ratios as desired when the mechanism is either stopped or in motion.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 5 is a schematic view of the right side of a bicycle with the present mechanism, showing the adjustability of the pedal pivot points and corresponding pedal swing or travel.

FIG. 13 is a broken away perspective view of the rear portion of the stand of FIG. 11, showing the adjustably positionable flywheel and friction brake mechanism therefor.

Similar reference characters denote corresponding features consistently throughout the attached drawings.

DETAILED DESCRIPTION OF THE PREFERRED EMBODIMENTS

The present invention comprises improvements in a pedal mechanism for pedal powered devices, such as a bicycle or the like, although the present invention could be applied to cycle cars, pedal powered exercise devices, and other pedal powered mechanisms as desired. The present mechanism provides significant advances in the adjustability and power transmission efficiency by a user of the device, thereby providing greater efficiency for a bicycle or other pedal powered device which is equipped with the present mechanism. A stationary stand may also be provided for holding a bicycle equipped with the present mechanism, for using the bicycle as an exercise machine as desired.

Figure 1:
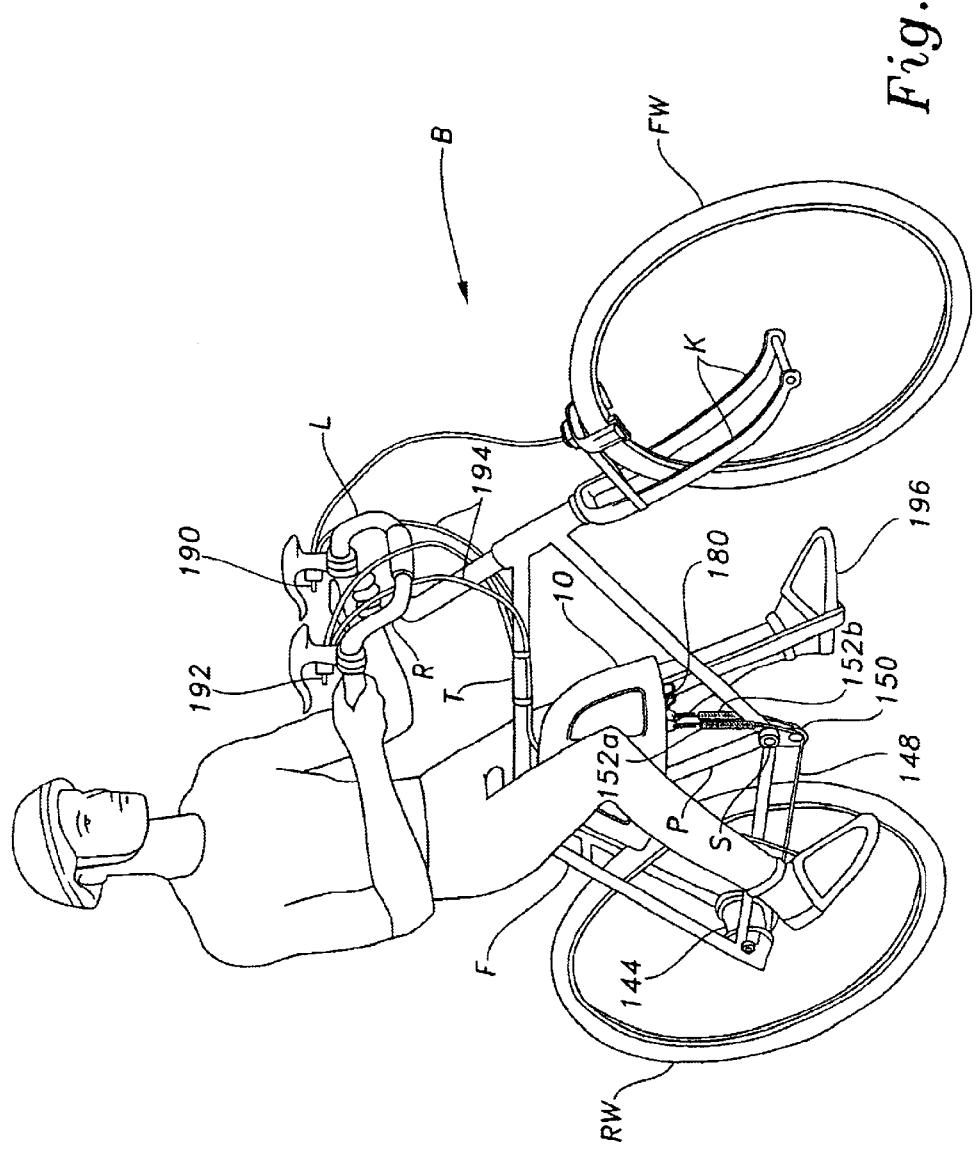
FIG. 1 is an environmental perspective view of a bicycle and rider using the present adjustable pedal drive mechanism.

FIG. 1 provides a general perspective view of a bicycle B equipped with the present mechanism. The bicycle B will be seen to be generally conventional, having a generally trapezoidal frame F with a diagonal frame member P which may extend generally upwardly to support the seat, in the case of a cycle having a fixed seat and using the diagonal as a seat post P. Alternatively, the seat may be adjustably mounted along the top frame member T, as shown in FIG. 5 of the drawings. The device to which the present invention is applied includes at least one forward wheel FW which is mounted between a pair of front forks K, a rearwardly disposed drive wheel RW, a left and opposite right handlebar, respectively L and R, communicating with the steerable forward wheel FW, and a pedal shaft bushing or sleeve S laterally disposed at or near the base of the seat post frame member P. The above description applies to a conventional bicycle, but it will be seen that additional wheels could be provided to form a cycle car or tricycle, or some other form of pedal powered vehicle or device having a similar structure.

It will be seen that various relatively minor modifications have been made to the bicycle B of FIG. 1, in order to accommodate the present invention therewith. For example, it will be noted that the conventional pedal mechanism has been removed from the pedal shaft bushing S of the bicycle B of FIG. 1, as it is no longer needed for propelling the bicycle B equipped with the present adjustable pedal drive mechanism. Other modifications and attachments have also been provided, as described further below.

Figure 2:
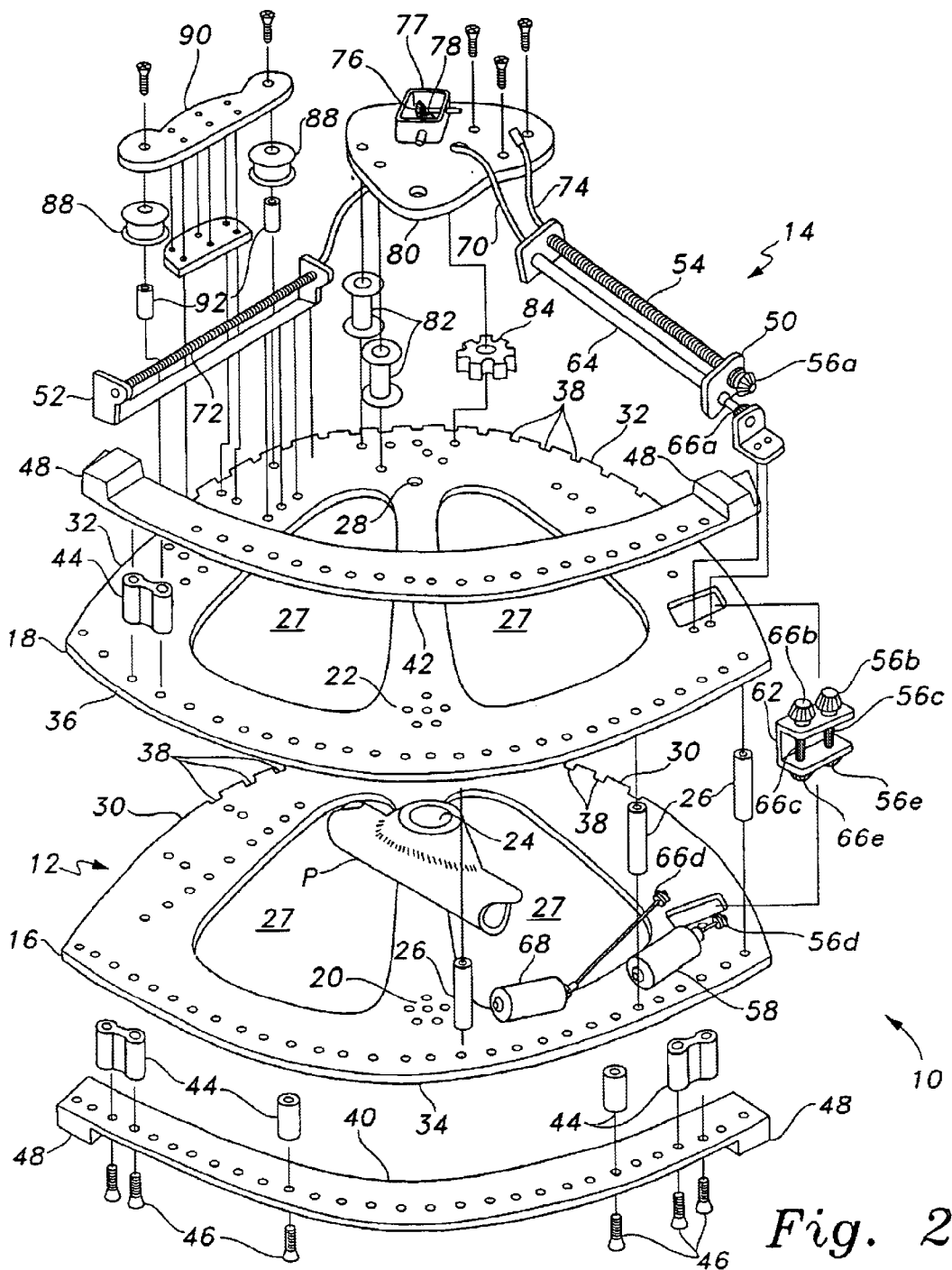
FIG. 2 is an exploded perspective view of the pedal adjustment plate assembly of the present mechanism, showing details of its various components.

FIG. 2 provides an exploded perspective view of the pedal arm attachment assembly 10 of the present adjustable pedal drive mechanism. The assembly 10 may also be seen generally in FIG. 1, installed on the bicycle B. The assembly 10 essentially comprises a first or left pedal arm plate assembly 12 and opposite right plate assembly 14. It will be seen that these two plate assemblies 12 and 14 are mirror image structures. The two plate assemblies 12 and 14 each include a plate, respectively 16 and 18, each having a respective attachment point 20 and 22 comprising a plurality of screw or bolt attachment holes or passages. The plates 16 and 18 of the two assemblies 12 and 14 are pivotally secured to a pedal arm plate attachment boss (not shown) which resides in the bushing 24, by means of the attachment points 20 and 22 and a plurality of conventional screws or bolts (not shown), with the bushing 24 in turn being solidly affixed (welded, etc.) laterally across the diagonal frame member P between the seat end and opposite pedal shaft bushing S. A series of spacers 26 are affixed between the two plates 16 and 18 to affix them rigidly together relative to one another; only a few of the spacers 26 are illustrated in FIG. 2, for clarity in the drawing Figure. Lightening holes 27 may be provided in each plate 16 and 18 if so desired, to reduce the weight of the assembly.

Each of the plates 16 and 18 includes a pedal arm attachment point, with the right side pedal arm attachment point 28 being shown in FIG. 2 and the left plate pedal arm attachment point being concealed in the exploded perspective view. These pedal arm attachment points are located generally opposite the respective plate attachment points 20 and 22 to the bushing or sleeve 24 of the diagonal member P of the cycle frame F. The two plates 16 and 18 are each defined by opposite arcuate edges, with first or upper arcuate edges, respectively 30 and 32, defined by the respective pivot points 20 and 22 of the two plates 16 and 18 and the opposite second or lower edges, respectively 34 and 36, defined by the respective pedal arm attachment points (e. g., the pedal arm attachment point 28 shown in the right side plate 18).

The upper edges 30 and 32 each include a plurality of notches 38 formed therein, for the purpose of locking the position of the plate assembly 10 as desired for adjusting the position of the pedal arc, as will be explained further below. The opposite lower edges 34 and 36 each have a pedal arm guide retainer, respectively 40 and 42, secured thereto. These retainers 40 and 42 are secured to the respective plate lower edges 34 and 36 by a plurality of spacers 44 and screws 46 (with only a few of the spacers and screws being shown, for clarity in the drawings). Pedal arm guides for each of the pedal arms ride in the gap between each plate lower edge 34 and 36 and their corresponding arcuate retainer 40 and 42, as will be explained further below. A pedal arm bumper or stop 48 is located at each end of each retainer, to the outer portion thereof.

FIG. 2 also illustrates the adjusters providing for adjustment of the effective mechanical ratios of the forward and rearward strokes of the pedal arms of the present mechanism. While only the adjusting means for the right side assembly 14 is shown in FIG. 2, it will be understood that mirror image mechanisms are provided for the left side assembly 12. A first adjuster assembly 50 is affixed adjacent the forwardmost or uppermost portion (depending upon the arcuate adjustment of the assembly) of the arcuate edge 32 (and 30, in the case of the left side plate 16), with a second adjuster assembly 52 being located adjacent the rearwardmost or lowermost portion of the edge 32 (and 30). Each adjuster assembly 50 and 52 provides for the linear positional adjustment of a tension member (chain, cable, etc.) attached thereto, shown in other Figures and discussed in detail further below. These adjusters 50 and 52 provide for the infinitesimal adjustment of the effective mechanical ratio respectively of the first or rearward and second or forward pedal arm strokes of the present mechanism due to their threaded configuration, through predetermined ranges.

The first adjuster assembly 50 includes a threaded shaft 54, which is rotated by a bevel gear 56a. The bevel gear 56a is driven by a transfer bevel gear 56b, which is in turn rotated by an intermediate worm drive comprising roller shaft 56c and worm drive 56d, rotated by a first electric motor 58. This mechanism also transmits rotary motion to the opposite side of the pedal arm attachment assembly 10 by means of another transfer bevel gear 56e, extending from the opposite side of the worm shaft 56c and gear carrier 62 from the first transfer bevel gear 56b, to drive the opposite first adjuster assembly of the left plate 16.

A transfer shaft 64 is also contained in the first adjuster assembly 50, and rotates independently of the threaded adjuster shaft 54 of that assembly 50. The transfer shaft 64 receives its rotational input through a transfer shaft bevel gear 66a from a second transfer bevel gear 66b of the transfer gear assembly 62, which in turn receives rotational energy from a roller shaft 66c driven by the worm drive 66d of a second electric motor 68. As in the case of the right hand side shaft 54 and its opposite left hand counterpart, this mechanism also transmits rotary motion to the opposite side of the pedal arm attachment assembly 10 by means of another transfer bevel gear 66e, extending from the opposite side of the worm shaft 66c and gear carrier 62 from the first transfer bevel gear 66b, to drive the opposite first adjuster assembly of the left plate 16. The transfer shaft 64 in turn rotates a transfer cable 70 connected to the threaded adjuster shaft 72 of the second adjuster assembly 52, causing the adjuster shaft 72 to rotate according to rotary input from the opposite side mechanism through the transfer mechanism including second transfer bevel gears 66b and 66a, transfer shaft 64, and transfer cable 70.

Figure 3:
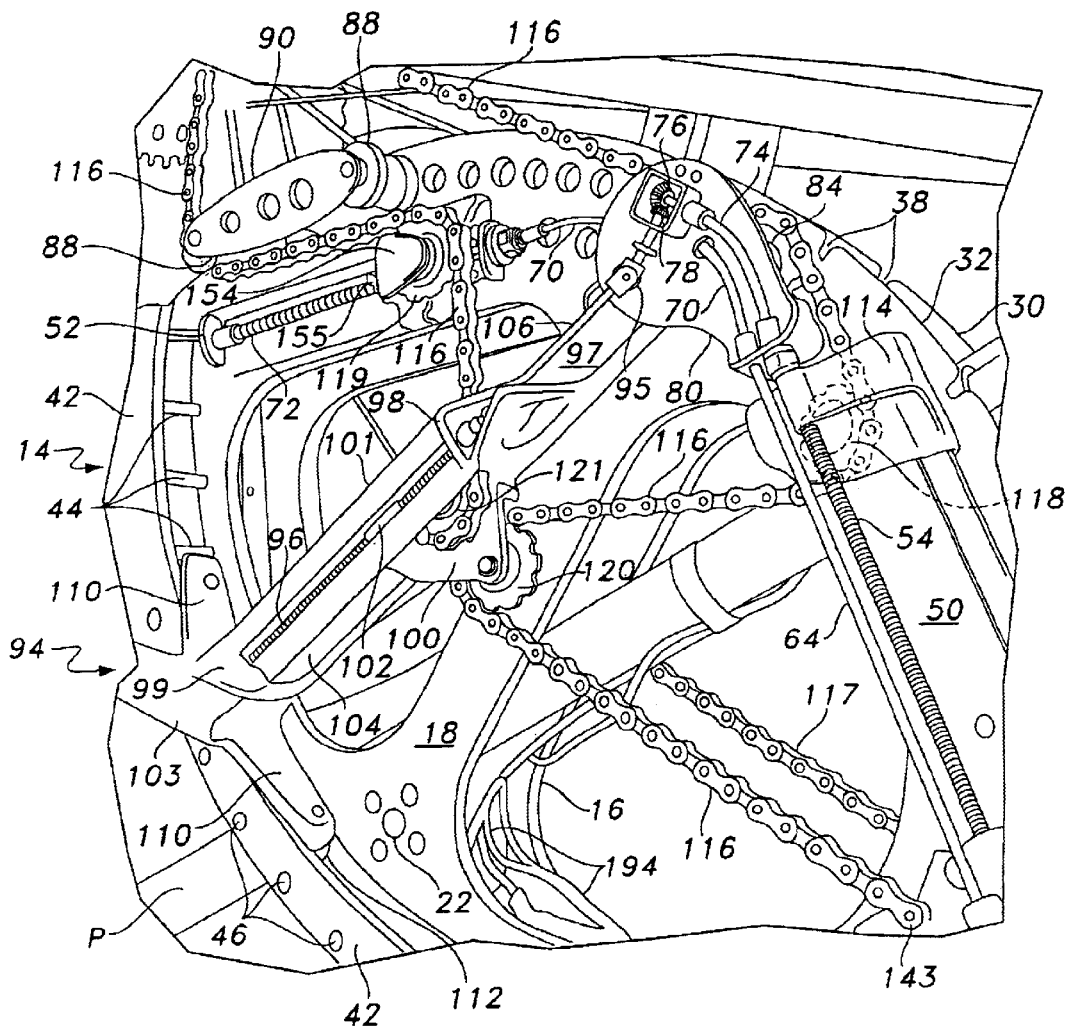
FIG. 3 is a broken away perspective view of the right side of the plate assembly of FIG. 2, with the corresponding right side pedal arm pivotally secured thereto, showing details of the assembly.

FIG. 2 also illustrates a further mechanical ratio adjuster means providing for infinitesimal adjustment of a third adjuster, located on the pedal arm and shown in detail in FIG. 3. (As in the case of the unseen left side adjusters of FIG. 2, each of the pedal arms includes such an adjuster and adjusting means, as in the right side assembly shown in FIG. 2.) The pedal arm adjusting means receives rotational input from the first adjuster screw shaft 54, by means of a transfer cable 74. This transfer cable 74 drives an output bevel gear 76 within a gearbox 77, which imparts rotational motion to a pedal adjuster bevel gear 78, secured to a plate 80. The plate 80 is spaced away from the main plate 18 by spacers 82 (only two of which are shown in FIG. 2, for clarity in the drawing Figure), to provide space for the attachment end of the pedal arm at its attachment point 28.

The pedal arm assembly, shown in FIGS. 3 and 4 and discussed it further below, includes a mechanical ratio adjuster which communicates with a flexible tension member (roller chain, flexible cable, etc.) which in turn communicates with adjuster assemblies adjustably positioned on each of the adjusters 50 and 52. The tension member in turn passes over a guide sprocket or roller 84 adjacent the attachment point 28 for the pedal arm, with the sprocket or roller 84 being captured between the plate 18 and the bevel gear plate 80 (with a like assembly secured to the opposite left side plate 16). The tension member extends essentially about a portion of the upper arcuate edge 32 of the plate 18, and is guided by a pair of generally peripheral rollers 88, which are retained by a plate 90. Spacers 92 are provided for the rollers 88 in order to position them coplanar with the tension member.

FIG. 3 provides a pictorial detail assembly view of a portion of the right side pedal arm attachment plate assembly 14, with the right side pedal arm retainer 42, first adjuster assembly 50, adjuster slide, right side pedal arm, pedal adjuster gear 78 and attachment plate 80, guide roller or sprocket 84, and a portion of the flexible tension member (e. g., roller chain) secured thereto. The left side assembly is a mirror image of the adjuster assembly 50 shown in FIG. 3. FIG. 4 provides an exploded perspective view of the right pedal arm assembly, as well.

Each pedal arm is pivotally secured to its respective pedal arm attachment point, e. g., the right side arm 94 is secured to the right side pedal arm attachment point 28 (shown in FIG. 2) by a bolt 95, pin, etc., shown beneath the U-joint connector of the pedal arm adjuster shaft. Each pedal arm comprises an elongate component having an attachment end 97 and a distal pedal end. The upper portion, near the pivotal attachment end 97, includes means for infinitesimally adjusting the effective mechanical ratio or length of the pedal arm. This adjusting means comprises a selectively rotatable threaded shaft 96 captured on each of the pedal arms and generally parallel thereto, e. g., the right pedal arm 94 shown in FIGS. 3 and 4, with each shaft 96 being captured by the opposite ends 98 and 99 of the upper portion of the arm 94.

An adjuster slide 100 is secured along the upper portion of the pedal arm 94 so that it may slidably move upwardly and downwardly along the length of the pedal arm 94 between the two ends 98 and 99. The slide 100 has an internally threaded portion 102 cooperating with the threads of the threaded shaft 96, thereby causing the slide 100 to travel upwardly or downwardly along the upper portion of the pedal arm 94 when the threaded pedal arm shaft 96 is rotated. The extended roller or sprocket carrier comprising the main structure of the slide 100, extends from a longitudinal slot 104 formed in the side of the upper portion of the pedal arm 94, thus preventing the slide 100 from turning or rotating relative to the pedal arm 94 when the threaded drive 96 is actuated. When the threaded shaft 54 of the first adjuster assembly 50 is rotated, the corresponding rotation of the transfer cable 74, output gear 76, and pedal adjuster gear 78 cause the pedal adjuster shaft 106 to rotate, thus rotating the threaded pedal shaft 96 as desired to move the adjuster slide 100 along the pedal arm.

Each pedal arm, e. g., arm 94, is secured to the lower arcuate edge 36 of its corresponding plate 18 by the corresponding pedal arm retainer 42, as described below for the right side pedal arm 94. The pedal arm 94 comprises an upper portion 101 and a lower extension 103, which extends from the upper portion 101 generally from the lower or distal end 99 of the upper arm portion 101. The lower arm portion 103 will be seen to be attached to the outer surface of the upper portion lower end 99, and is outwardly offset from (but parallel to) the plane of motion of the arm upper portion 101 to provide clearance to the outside of the pedal arm retainer 42. This lower arm portion 103 is also angled rearwardly relative to the upper arm portion 101, when the upper arm portion 101 is disposed in a generally vertical orientation. A guide shoe 110 is affixed to the pedal arm upper portion 101 immediately below the lower or distal end 99 thereof, and rides in the space defined by the retainer 42 and the immediately underlying portion of the plate 18, adjacent its lower arcuate edge 36. A forward and a rearward roller 112 extend from the guide shoe 110, and fit closely within the space between the retainer 42 and plate 18 to preclude lateral play between the pedal arm 94 and the retainer 42 and plate 18, yet allow the pedal arm 94 to move smoothly in its reciprocating arcuate travel path along the lower edge 36 of the plate 18.

A first adjuster slide 114 configured similarly to the pedal arm slide 100 is slidingly secured to the first adjuster assembly 50, and is adjustably positioned along the assembly 50 by the threaded first adjuster shaft 54, similarly to the adjustment of the pedal arm slide 100 described further above. An elongate, flexible tension member 116 (e.g., the roller chain shown in FIG. 3, but alternately flexible cable, etc.) wraps around a sprocket (for chain) or roller (for cable) 118, shown in broken lines within the body of the adjuster slide 114. A portion of the opposite left side chain 117 is also visible in FIG. 3, on the opposite side of the diagonal or seat post tube P. The opposite adjuster slide 154 for forward pedal strokes includes a similar sprocket or roller 119, more clearly pictured in FIG. 3.

Figure 4:
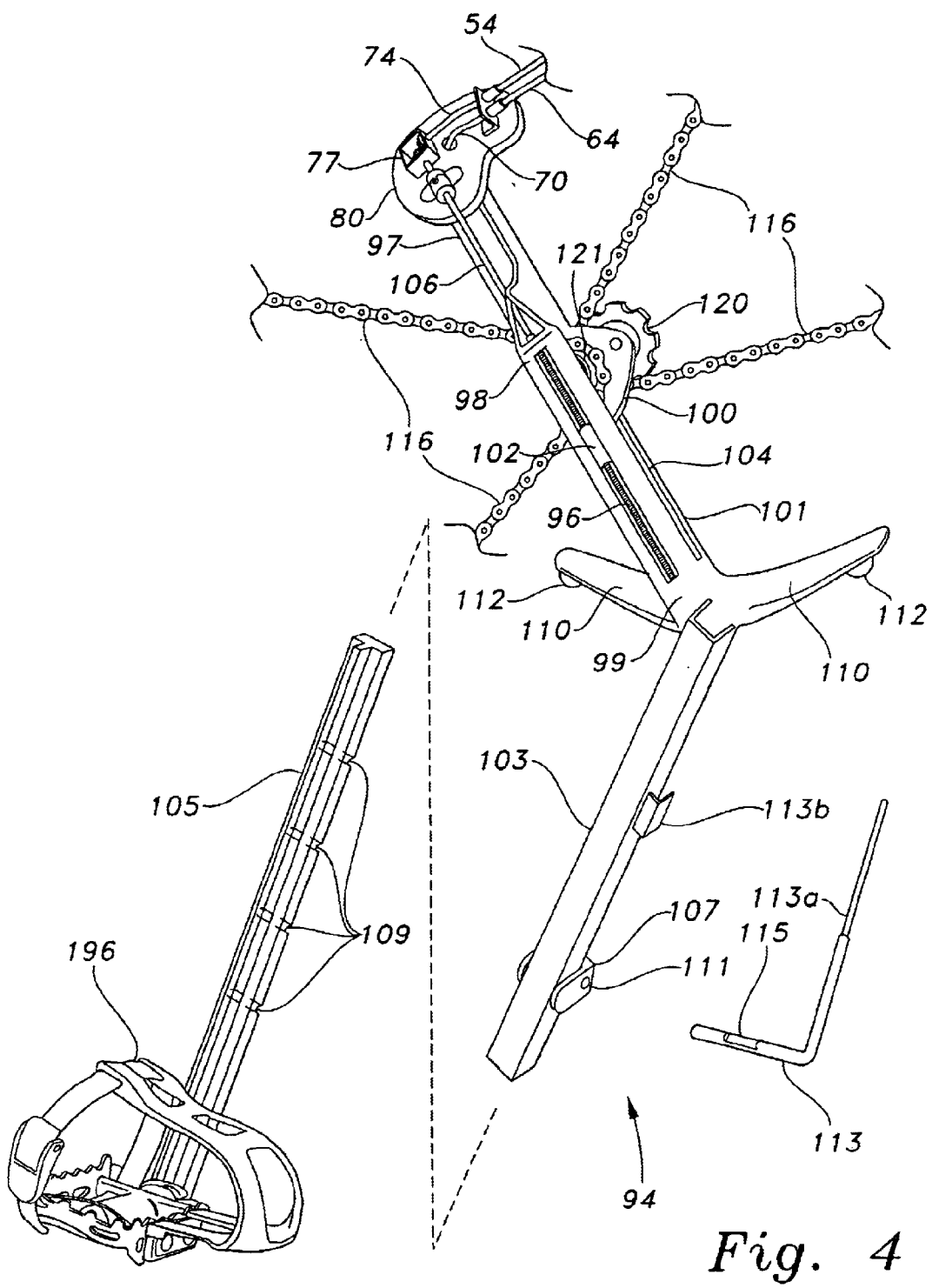
FIG. 4 is a broken away exploded perspective view of the right side pedal arm assembly, showing the tension member communication with the pedal arm adjuster and the attachment of the pedal arm extension to the pedal arm.

It will be noted in FIGS. 3 and 4 that the chain or cable 116 also wraps about a pair of rollers or sprockets, respectively 120 and 121, carried on the pedal arm adjuster 100. The tension member 116 extends from an attachment point 143 on the plate 18 to wrap about the rearward stroke pedal arm adjuster sprocket or roller 120, continuing to the rearward stroke adjuster sprocket or roller 118, thence continuing around the remainder of the plate assembly 14 components and wheel drive sprocket of the machine. The tension member 116 then extends back to the plate assembly 14, around the forward stroke pedal arm adjuster sprocket or roller 121, and secures to a point or hook 155 on the slide adjuster 154. The complete path of the tension member 116 is shown in FIGS. 6A through 7B for various configurations, and described further below.

FIG. 4 also illustrates the complete right side pedal arm assembly 94, with it being understood that the opposite unshown left pedal arm assembly is a mirror image of the right assembly 94. As described further above, the pedal arm assembly 94 generally comprises an upper portion 101 with a lower or distal portion 103 extending from the lower end 99 of the upper portion 101. The lower portion 103 of the pedal arm 94 has a rectilinear channel cross section, as may be seen in its attachment end to the pedal arm upper portion 101. This channel accepts the stem of a T-section extension 105, to allow the extension 105 to slide upwardly and downwardly along the channel of the fixed lower portion 103 of the arm assembly 94. A retainer bracket 107 is provided about the open side of the lower portion channel 103, with the extension 105 being captured between the channel 103 and retainer 107.

The extension 105 includes a series of semicircular reliefs 109 formed laterally across the stem of the T section, i. e., from edge to edge of the width of the stem. The retainer bracket 107 includes a lateral passage 111 therethrough, with a locking pin 113 installable therethrough. The pin 113 includes a flat 115, which allows the lower pedal arm extension 105 to slide upwardly and downwardly within the channel 103 and retainer 107, when the pin 113 is turned to align the flat 115 with the face of the stem of the T-section of the extension 105. The pin 113 preferably has a right angle extension 113a, which may be captured by a hook 113b or the like extending from the side of the lower arm portion 103 to lock the pin 113 and extension 105 in position as desired.

As noted further above, the pedal arm attachment assembly 10 is arcuately adjustable relative to the frame F of the pedal powered device B, about the plate assembly attachment bushing 24 and bearing therein (not shown). The left and right pedal arms each pivot about their respective attachment points on their respective pedal arm plate assemblies, e. g., the right side pedal arm 94 is pivotally secured to the right side plate assembly 14 at the pedal arm attachment point 28, as described further above. Each pedal arm may thus swing through an arc having its end points defined by the respective forward and rearward pedal arm stops 48 of the respective pedal arm track 40 or 42. Accordingly, it will be seen that the repositioning of the pedal arm plate assembly 10 serves to provide different pedal arm travel arcs relative to the bicycle frame F, depending upon the position of the plate assembly 10. This repositioning of the plate assembly 10 results in the repositioning of the pedal arm attachment points relative to the bicycle frame F, e. g., the right pedal arm attachment point 28, due to its different location from the plate attachment points 20 and 22 about which the two plates pivot adjustably relative to the frame F, to accomplish the adjustment of the pedal arm travel arcs.

FIG. 5 provides a schematic right side elevation view of the adjustment range of the plate assembly and pedal arm travel arcs relative to the bicycle frame F. A first position shows the pedal arm attachment plate assembly in solid lines, with this position being designated as plate assembly 10a. An alternative second position for the plate assembly is shown in broken lines, with the broken line position being designated as assembly 10b. The plate assembly 10a, 10b is pivotally secured to the bicycle frame F at the pedal arm assembly attachment bushing 24 which is in turn affixed to the diagonal or seat post member P, with the bushing 24 being indicated schematically by the designated center mark in FIG. 5.

As the pedal arm assembly is shifted from its first position 10a to its second position 10b, it will be seen that the separate pedal arm attachment points are also shifted arcuately about the plate attachment point 24. The first pedal arm attachment point corresponds to the first plate position 10a and is designated as point 28a, with the second pedal arm attachment point corresponding to the second plate position 10b being designated as 28b. The first plate position 10a shown is generally at or near one limit of adjustment of the plate assembly, and provides a pedal arm arc 122a limited by the corresponding pedal arm stops 48 (FIG. 2), with the corresponding pedal arm arcuate limits being designated by pedal arms 94a and 94b in FIG. 5.

The opposite adjustment position, represented by plate position 10b, is generally at or near the opposite limit of positional adjustment for the plate assembly. This plate position 10b provides a pedal arm arc 122b, with the limits of the arc 122b again being set by the stops 48. The corresponding pedal arm arcuate limits are designated by pedal arms 94c and 94d, shown in broken lines.

As the center of each arc 122a and 122b is generally defined by a line extending from its respective pedal arm pivot point 28a or 28b and the plate attachment point 24, it will be seen that the first arc 122a is disposed generally downwardly from the pedal arm attachment point 28a (and plate attachment point 24), while the second arc 122b is disposed generally forwardly of the pedal arm attachment point 28a and plate attachment point 24. Thus, the operator of the present mechanism may select either of the above plate adjustment positions 10a or 10b, or any position therebetween as desired, in order to adjust the pedal arm travel range as desired. It will be understood that the positions shown, particularly the second plate position 10b, represent extremes which may not be used, but the present mechanism is capable of providing such extreme limits, if the operator so desires.

FIG. 5 also illustrates further variability for the geometry of the bicycle or pedal powered device B. It will be noted that the handlebars may be adjusted conventionally about their attachment point to the front wheel steering shaft, as indicated by the right side handlebar in FIG. 5, shown in a first position R1 in solid lines and second and third positions R2 and R3 in broken lines. Also, rather than attaching the seat conventionally to the upper end of the diagonal or seat post P of the frame F, the seat may be adjustably or slidably installed along the top member T of the frame F, as indicated by the rearward solid line position 123a and forward position 123b shown in broken lines. Thus, the rider may adjust the seat to a relatively rearward position 123a, the handlebars rearwardly to a position somewhat as shown at R2, and rotate the two pedal arm attachment plates 16 and 18 counterclockwise to positions on the order of the position 10b illustrated in FIG. 5, to achieve exercise and flexure of certain muscle groups or to gain a certain mechanical advantage in certain types of terrain. The opposite extreme may be achieved by adjusting the handlebars to the position R3, the seat toward position 123b, and rotating the pedal arm attachment plates 16 and 18 clockwise toward the position 10a of FIG. 5. Of course, various permutations and combinations of any of these adjustments, along with the mechanical ratio adjustments provided by the forward and rearward stroke adjusters, pedal arm adjusters, and pedal extension adjustment, may be made as desired to provide an unlimited degree of adjustment for a pedal powered device using the present mechanisms.

Figure 9:
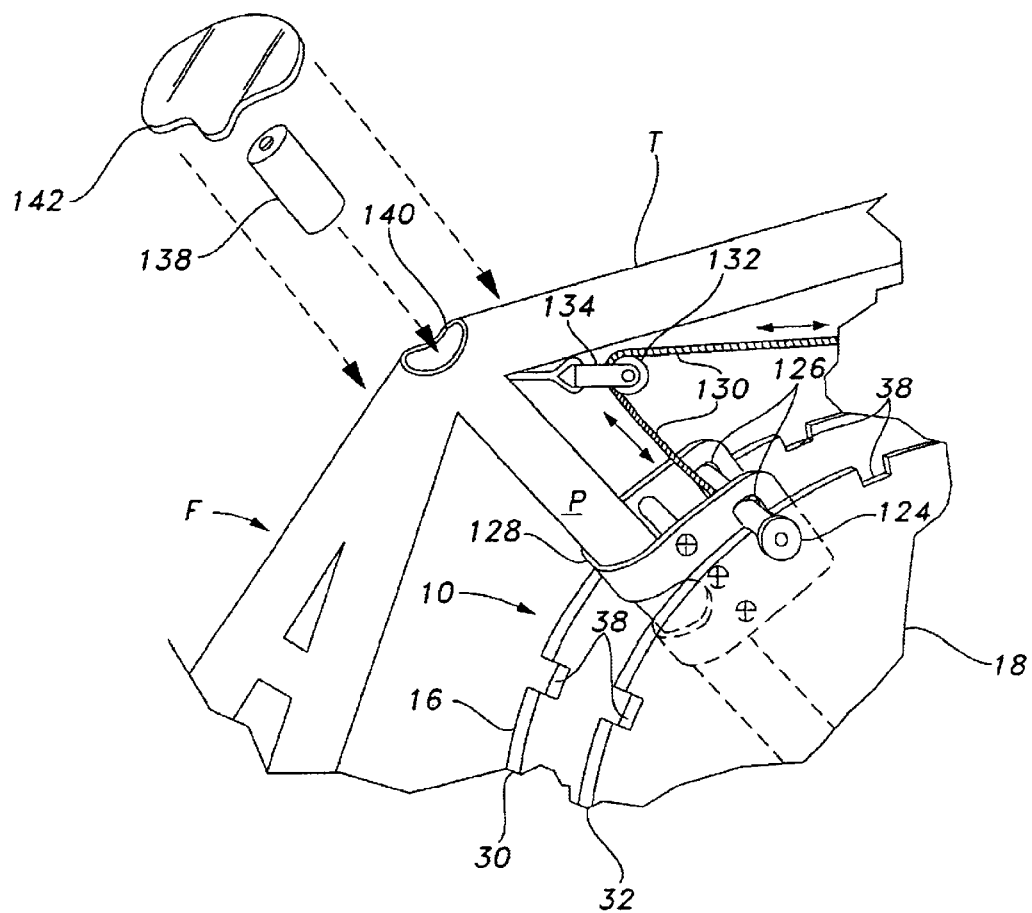
FIG. 9 is a broken away perspective view of a portion of the bicycle frame, showing details of the means for adjustably locking the pivotal positions of the pedal arm attachment plates thereto and electrical cell storage within the frame.

Some means must be provided for locking or securing the plate assembly 10 at the desired position during operation. FIG. 9 illustrates a broken away detailed perspective view of the latching means used to secure the plate assembly 10 in the desired position. A laterally disposed latch pin 124 slides radially inwardly and outwardly with respect to the plate assembly 10, in a slot 126 formed in a bracket 128 secured to the upper end of the diagonal or conventional seat post frame member P of the pedal powered device. The latch pin 124 selectively engages a given laterally spaced pair of slots or notches 38 formed in the upper arcuate edges 30 and 32 of the two plates 16 and 18 comprising the pedal arm plates 10.

The pin 124 is selectively lifted from a given slot or notch pair 38 by a cable or other suitable flexible tension member 130 which extends from a point at the front of the pedal driven device, e. g., a conventional brake lever handle or the like, at either of the handlebars L or R of the cycle B or pedal driven device. The cable or tension member 130 is reeved over a pulley 132 and through a bracket and guard 134, which is in turn secured to the frame F of the pedal powered device. The pin 124 is biased or urged toward the pivot centers 20 and 22 of the two plates 16 and 18 by a conventional spring (not shown), in order to hold the pin 124 in position as desired to lock the plate assembly 10 in the desired orientation or position.

FIG. 9 also illustrates the means provided for physically holding or storing the electrical storage batteries 138 which are used to actuate the electric motors 58 and 68 (FIG. 2) for operating the first pedal stroke adjuster 114, pedal arm adjuster 100, and second pedal stroke adjuster 154 (FIG. 3). Conventional electrical contacts (not shown) may be installed within the hollow tubular diagonal or seat post frame member P, as in the construction of a conventional flashlight or the like. A battery access opening or passage 140 is cut into the frame F at the upper juncture of the top and diagonal tube frame members T and P, with a suitable cover 142 (e. g., flexible plastic sheet, rigid cover, etc., as desired) being removably placed over the battery access opening 140 to seal out moisture and debris and to hold the batteries 138 in place.

Figure 6A:
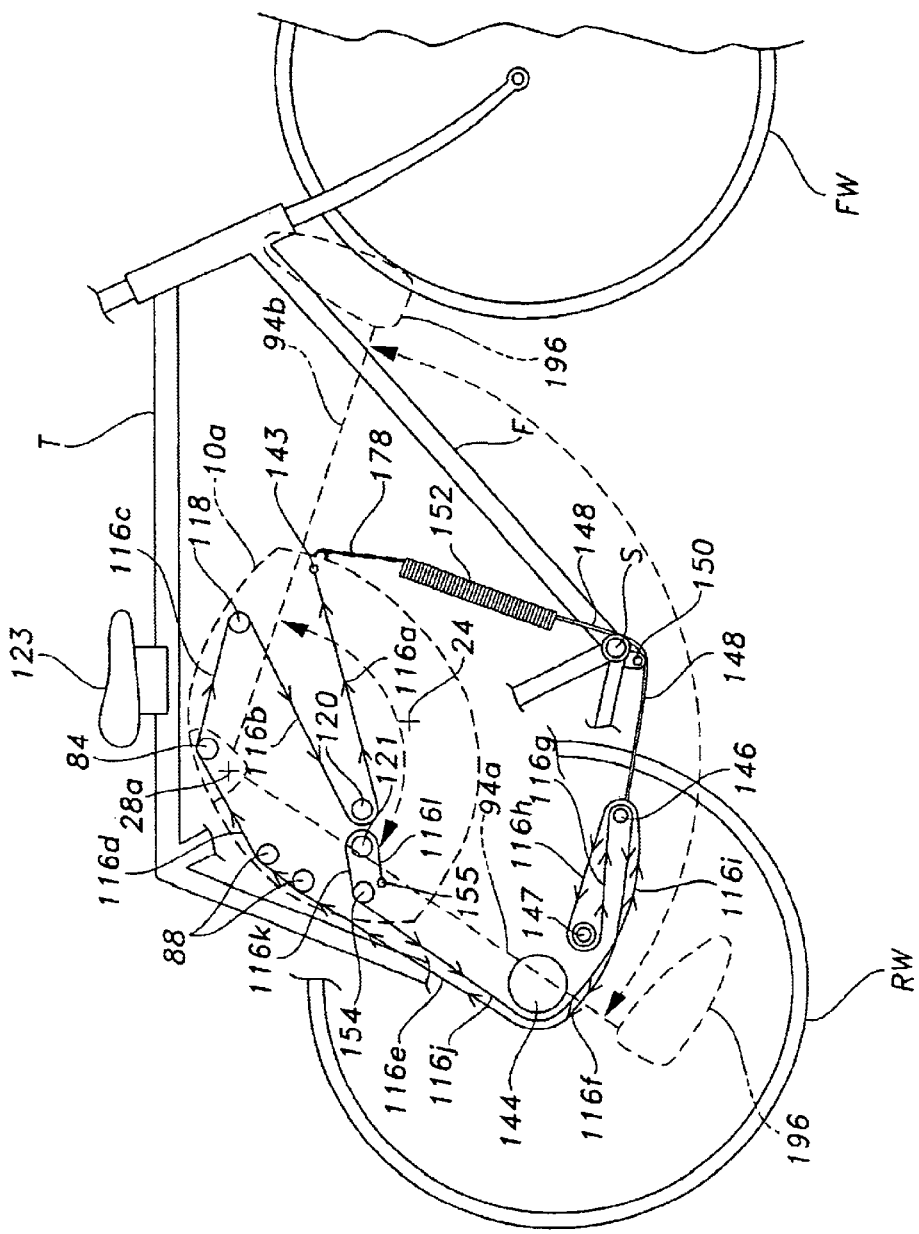
FIG. 6A is a right side schematic view, showing the chain or cable run for the corresponding right pedal arm, with the pedal arm at its maximum rearward travel and the pedal arm attachment plate pivotally adjusted to its uppermost arcuate position.
Figure 6B:
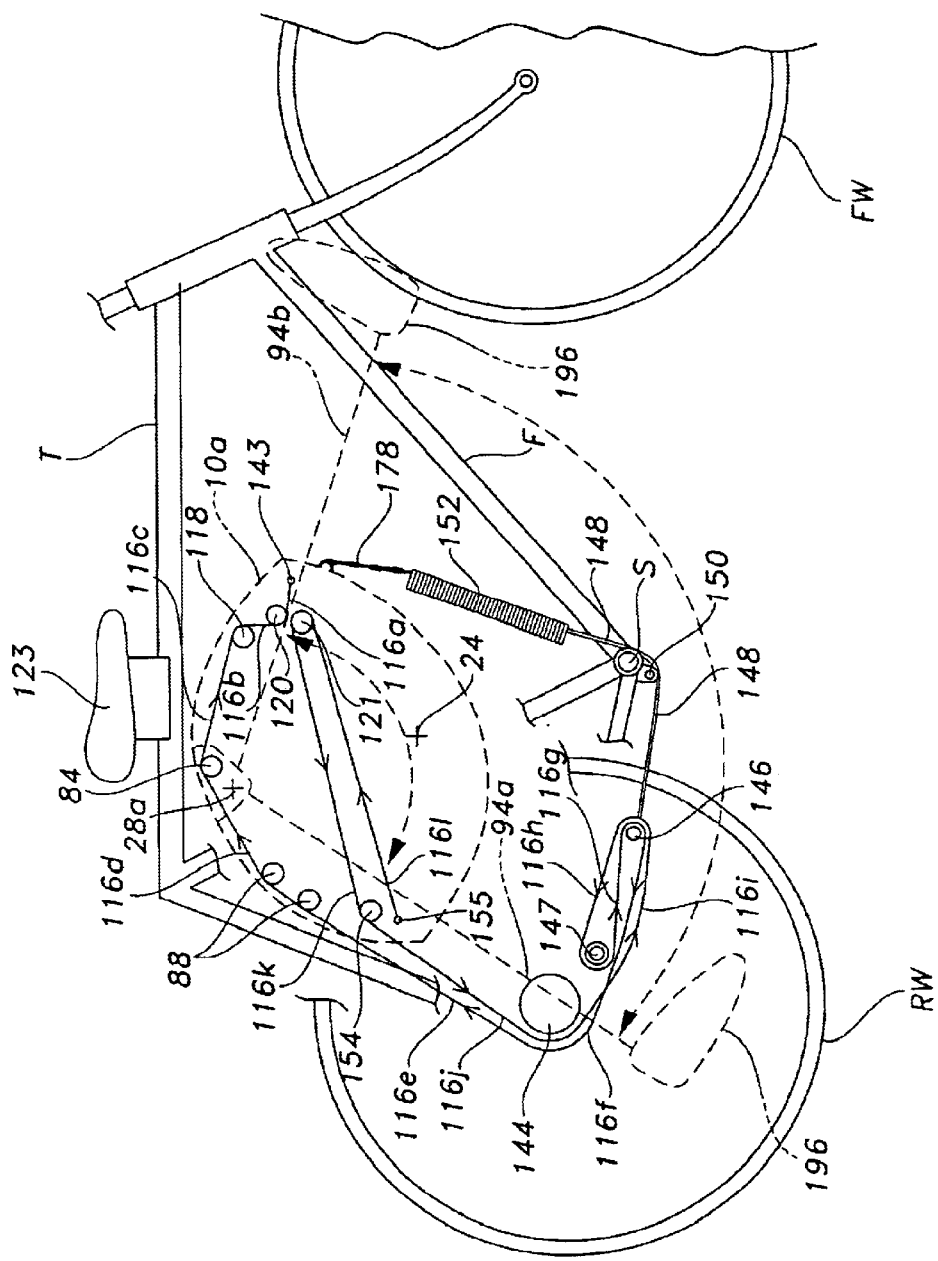
FIG. 6B is a right side schematic view similar to FIG. 6A, but showing the chain or cable linkage and path with the right pedal arm in its maximum forward or upward travel position.
Figure 7A:
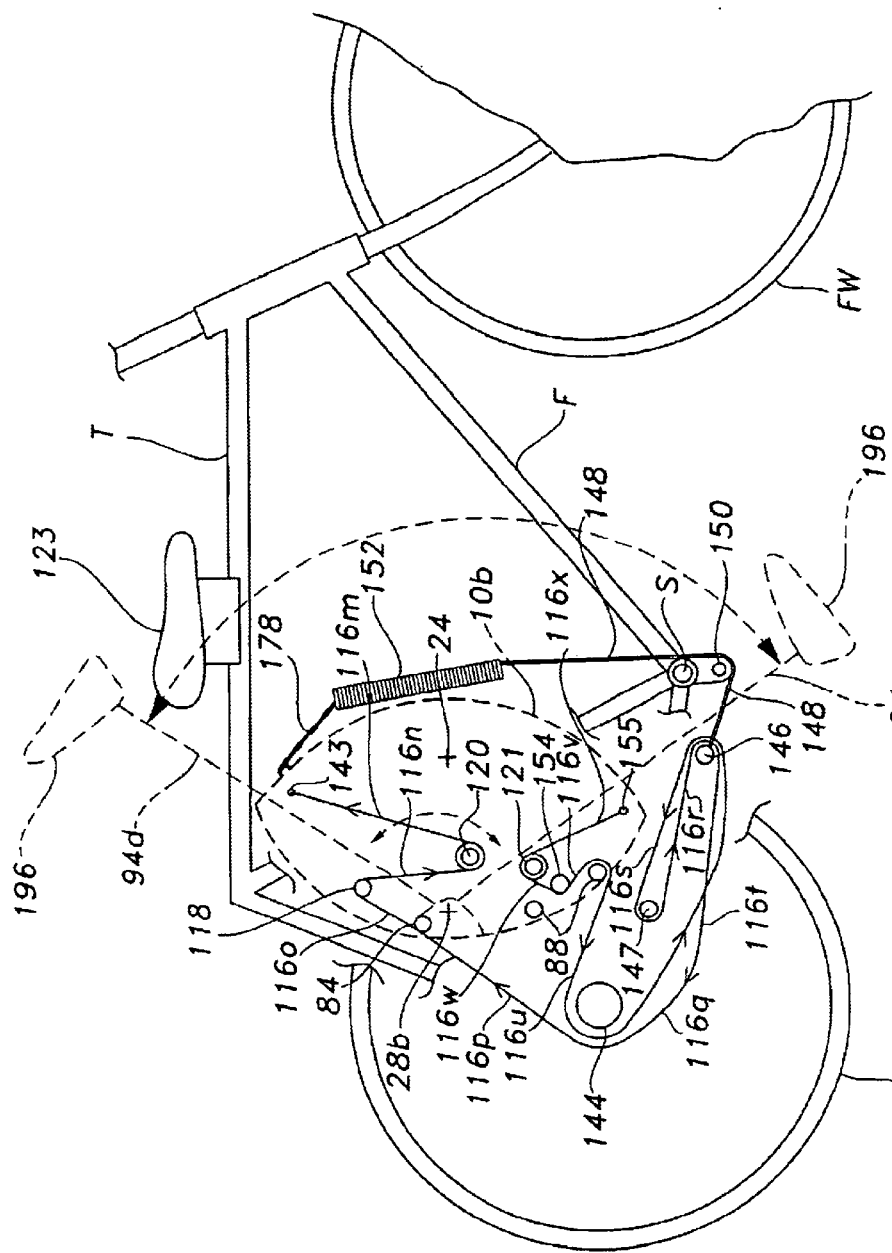
FIG. 7A is a right side schematic view, showing the chain or cable run for the corresponding right pedal arm, with the pedal arm at its maximum rearward travel and the pedal arm attachment plate pivotally adjusted to its rearwardmost arcuate position.
Figure 7B:
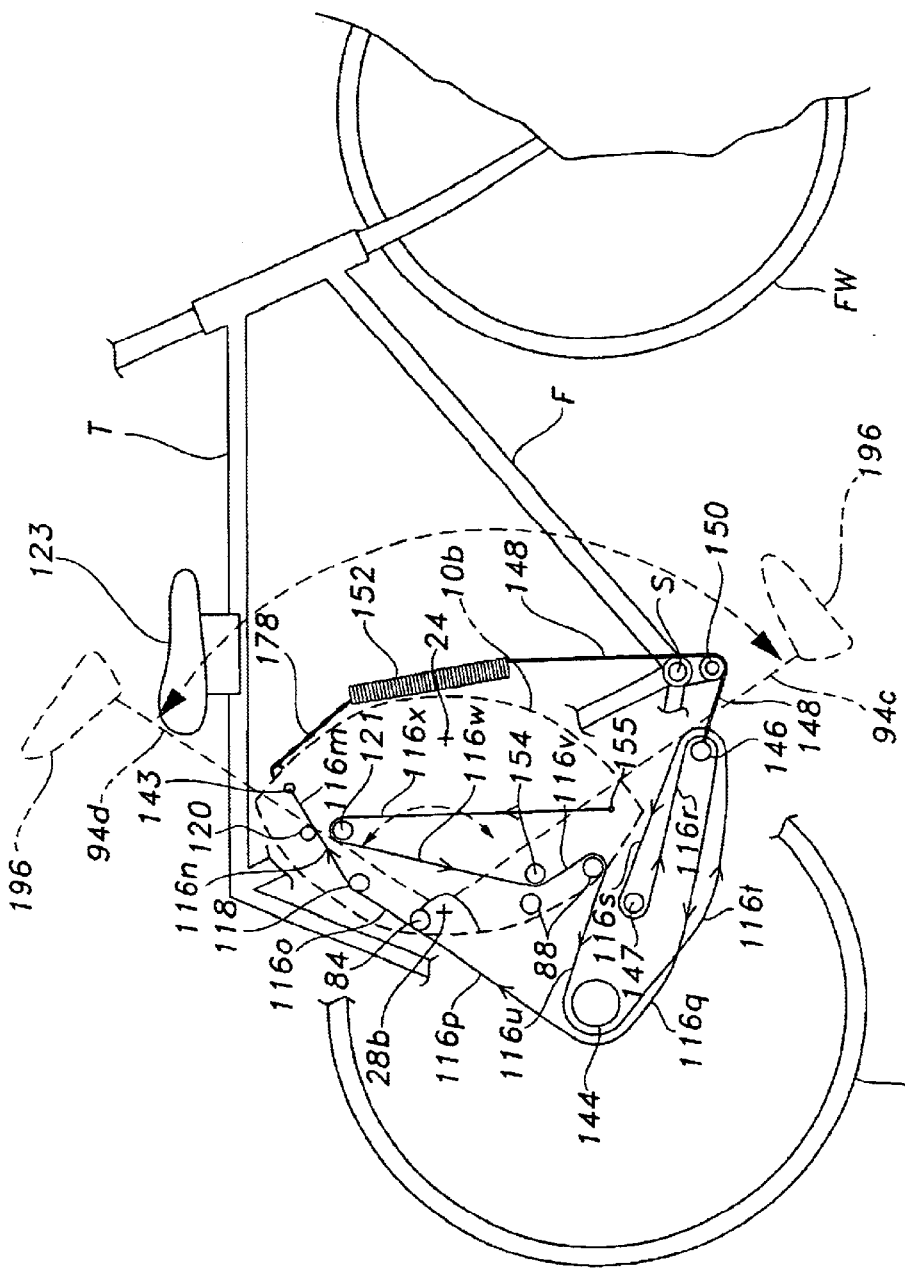
FIG. 7B is a right side schematic view similar to FIG. 7A, but showing the chain or cable linkage and path with the right pedal arm in its maximum forward or upward travel position.

The above described pedal arm travel arc adjustment provided by selectively adjusting the position of the plate assembly 10 as described above, is operational regardless of any specific settings of the adjuster slides 100 of the pedal arm, 114 of the first adjuster assembly 50, and the adjuster slide 154 for the second adjuster assembly 52. FIGS. 6A and 6B schematically illustrate the routing of the tension member (chain, cable, etc.) for a downwardly and rearwardly positioned plate assembly 10 and relatively low mechanical ratio for relatively higher speeds. FIGS. 7A and 7B schematically illustrate the tension member routing for a forwardly positioned plate assembly 10 having a relatively high ratio for the pedal adjuster and first adjuster, and relatively low ratio for the second adjuster. It will be understood that the schematic routings and ratios indicated in FIGS. 6A through 7B are exemplary, and that a practically infinite variety of ratios may be provided by the present device with its infinitesimal adjustments.

In FIG. 6A, the plate assembly shown in broken lines is oriented generally in the manner of the plate assembly 10a of FIG. 5, and is designated by the same reference character 10a. The right side pedal arm is shown in broken lines in both its rearwardmost position 94a and opposite uppermost or forwardmost position 94b. However, only the tension member run or routing for the rearwardmost position 94a is shown in FIG. 6A, with the tension member run for the forwardmost position 94b of the pedal arm being shown in FIG. 6B, for clarity in the drawing Figures.

The tension member (chain, cable, etc ) is generally indicated by the reference character 116, with different segments of the tension member being indicated by different alphabetic subcharacters for the basic tension member 116. It should be noted that the arrowheads positioned along the tension member are not indicative of a direction of travel, as the tension member oscillates or reciprocates back and forth during operation of the machine. Rather, the arrowheads serve merely to indicate directional continuity of the tension member, with their direction being unimportant.

The tension member extends from a first or forward attachment point 143 on the pedal arm adjuster plate assembly 10a and about the first sprocket or roller 120 of the pedal arm ratio adjuster slide 100, as indicated by the first tension member segment 116a shown in FIG. 6A. The tension member continues from the first sprocket or roller 120 of the pedal arm adjuster slide 100 to pass around the sprocket or roller 118 of the first or forward adjuster slide 114, indicated by the second tension member segment 116b. After passing around the sprocket or roller 118 of the first or forward adjuster slide 114, the tension member passes over the sprocket or roller 84 located adjacent the pivot point 28a for the plate assembly 10a and continues over the two guide rollers 88, as indicated by the third and fourth tension roller segments 116c and 116d. The tension member then continues generally downwardly to the rear or drive wheel hub assembly 144 (shown in detail in FIG. 8), indicated by the fifth tension roller segment 116e in FIG. 6A.

After passing around the first sprocket (or roller, for a flexible cable tension member) of the hub assembly 144, the tension member continues forwardly to a tensioner pulley 146, with the tension member segment between the hub 144 first sprocket and the tensioner pulley 146 designated as segment 116f. The tensioner pulley 146 is positioned by a cable 148 or the like which passes about a guide pulley 150 beneath the pedal shaft bushing or sleeve S of the frame F, and upwardly to a tension member adjuster 152 (e.g., spring, bungee or other tensioning device, etc.). The spring 152 is anchored at its frame attachment end to a tensioner or latch assembly secured to the plate assembly 10, illustrated in FIG. 10 of the drawings and discussed in detail further below. This tensioner 152 serves to maintain tension on the tension member throughout its run, to maintain engagement with the sprocket teeth (in the case of roller chain). Alternatively, a flexible cable tension member may include multiple wraps about respective pulleys or rollers at the rear wheel hub 144 with a central wrap anchored to the corresponding roller, to provide the required rotation of components by means of generally linear motion of the cable.

The tension member generally reverses its direction after passing around the tensioner pulley 146, with the tension member segment 116g extending from the tensioner pulley 146 back to an idler pulley 147 which is positioned generally medially between the tensioner pulley 146 and the drive wheel hub assembly 144. From the idler pulley 147, the tension member extends back to a second sprocket or roller of the tensioner assembly 146 and back around another sprocket or pulley of the drive wheel hub assembly 144, as indicated respectively by the tensioner segments 116h and 116i.

After wrapping or passing about the second sprocket or roller of the hub assembly 144, the tension member segment 116j extends generally upwardly to the second ratio adjuster slide and pulley or sprocket 154, essentially the same as the slide 114 of FIG. 3, and shown schematically in FIGS. 6A through 7B. From the second slide and pulley 154, tension member segment 116k extends to wrap around the second sprocket or pulley 121 of the pedal arm adjuster assembly 100 (shown in FIG. 3), and continues as a final segment 116l to an attachment point 155 on the rear adjuster slide 154.

The above described tension member linkage path results in the tension member reciprocating back and forth about the first and second sprockets of the rear wheel hub assembly 144 when the two pedal arms are swung arcuately back and forth. The sprockets are provided with one way drive means (sprag clutches, ratchets, cam and roller, etc.) to free wheel in a non-driving direction, and to engage to drive the rear wheel forwardly (clockwise, in the right side views of FIGS. 6A through 7B). The specific details of the hub assembly 144 are discussed further below in the discussion of FIG. 8 of the drawings. It will be understood that the left side plate assembly 12 includes a tension member path which is essentially a mirror image of that described above for the right side of the cycle B, with the left tension member wrapping about a third and a fourth sprocket or roller of hub assembly 144.

FIG. 6B illustrates the route of the tension member with the pedal arm adjuster plate assembly 10a remaining in the same relative position as that shown in FIG. 6A, but showing the tension member run with the pedal arm swung forwardly and upwardly to arm position 94b. The tension member run is generally the same as that described above in FIG. 6A for the rearward pedal arm position, but it will be seen that the first two tension member segments 116a and 116b which extend respectively from the first plate attachment point 143 to the first pedal arm sprocket or roller 120, and from that sprocket or roller 120 back to the first pedal arm adjuster sprocket or roller 118, are considerably shorter than those comparable tension member segments 116a and 116b in FIG. 6A due to the upward and forward pedal arm 94b position. Similarly, the final two tension member segments 116k and 116l are considerably longer than those comparable segments shown in FIG. 6A, due to the forward and upward repositioning of the pedal arm 94b. Otherwise, the tension member paths of FIGS. 6A and 6B showing the extreme positions 94a and 94b of the pedal arm, are essentially the same.

FIGS. 7A and 7B schematically illustrate an alternative position for the pedal arm plate assembly, having a position similar to that of the assembly 10b shown in broken lines in FIG. 5 and indicated by the same reference character. FIGS. 7A and 7B are respectively equivalent to FIGS. 6A and 6B, with the tension member shown for the lower pedal arm position 94c in FIG. 7A and for the upper pedal arm position 94d in FIG. 7B.

In FIG. 7A, the tension member extends from the first or forward attachment point 143 on the pedal arm adjuster plate assembly 10b and about the first sprocket or roller 120 of the pedal arm ratio adjuster slide 100, as indicated by the first tension member segment 116m shown in FIG. 7A. The tension member continues from the first sprocket or roller 120 of the pedal arm adjuster slide 100 to pass around the sprocket or roller 118 of the first or forward adjuster slide 114, as indicated by the second tension member segment 116n. After passing around the sprocket or roller 118 of the first or forward adjuster slide 114, the tension member passes over the sprocket or roller 84 located adjacent the pivot point 28b for the plate assembly 10b and continues generally downwardly to the rear or drive wheel hub assembly 144 (shown in detail in FIG. 8), as indicated by the third and fourth tension roller segments 116o and 116p in FIG. 7A. It will be noted that due to the counterclockwise repositioning of the plate assembly 10b relative to its orientation as plate assembly 10a in FIGS. 6A and 6B, that the tension member does not contact the two guide rollers 88 along this portion of its run. Hence, the tension member segment 116p extends all the way from the plate pivot point sprocket or roller 84, to the hub assembly 144.

After passing around the first sprocket (or roller, in the case of a flexible cable tension member) of the hub assembly 144, the tension member continues forwardly to the tensioner pulley 146, with the tension member segment between the hub 144 first sprocket and the tensioner pulley 146 designated as segment 116q. As noted in the description of the mechanism of FIGS. 6A and 6B, the tensioner pulley 146 is positioned by a cable 148 or the like which passes about a guide pulley 150 beneath the pedal shaft bushing or sleeve S of the frame F, and upwardly to the tension member adjuster spring 152.

The tension member generally reverses its direction after passing around the tensioner pulley 146, with the tension member segment 116r extending from the tensioner pulley 146 back to the idler pulley 147. From the idler pulley 147, the tension member extends back to a second sprocket or roller of the tensioner assembly 146 and back around another sprocket or pulley of the drive wheel hub assembly 144, as indicated respectively by the tensioner segments 116s and 116t.

After wrapping or passing about the second sprocket or roller of the hub assembly 144, the tension member segment 116u wraps back around one of the two guide rollers or sprockets 88 and as segment 116v extends generally upwardly to the second ratio adjuster slide and pulley or sprocket 154, essentially the same as the slide 114 of FIG. 3, and shown schematically in FIGS. 6A through 7B. From the second slide and pulley 154, tension member segment 116w extends back to wrap around the second sprocket or pulley 121 of the pedal arm adjuster assembly 100 (shown in FIG. 3), and continues as a final segment 116x to the attachment point or hook 155 on the rear adjuster slide 154.

The above described arrangement provides significant advantages over the mechanism described in the present inventor's earlier filed application Ser. No. 09/208,276, in that the extension of the tensioner member 116 about a pair of pulleys or sprockets 120 and 121 on the pedal shaft 94 results in nominally twice the tensioner length being pulled across the drive hub 144 for a given arcuate travel of the pedal arms 94. This provides a significant speed advantage for a bicycle or other pedal powered machine equipped with such a mechanism. However, the ends of the tensioner members of the present invention may also be released from their respective attachment points 143 and 155 on the plate assembly 18 and on the rearward adjuster slide 154 and connected directly to the pedal arm adjuster 100, if so desired, e. g., inserting a removable pin through the passage in an end link of the roller chain and corresponding passage in the mechanism. Thus, the present mechanism provides significantly greater versatility than the mechanism of the present inventor's 09/208,276 application noted above.

Figure 8:
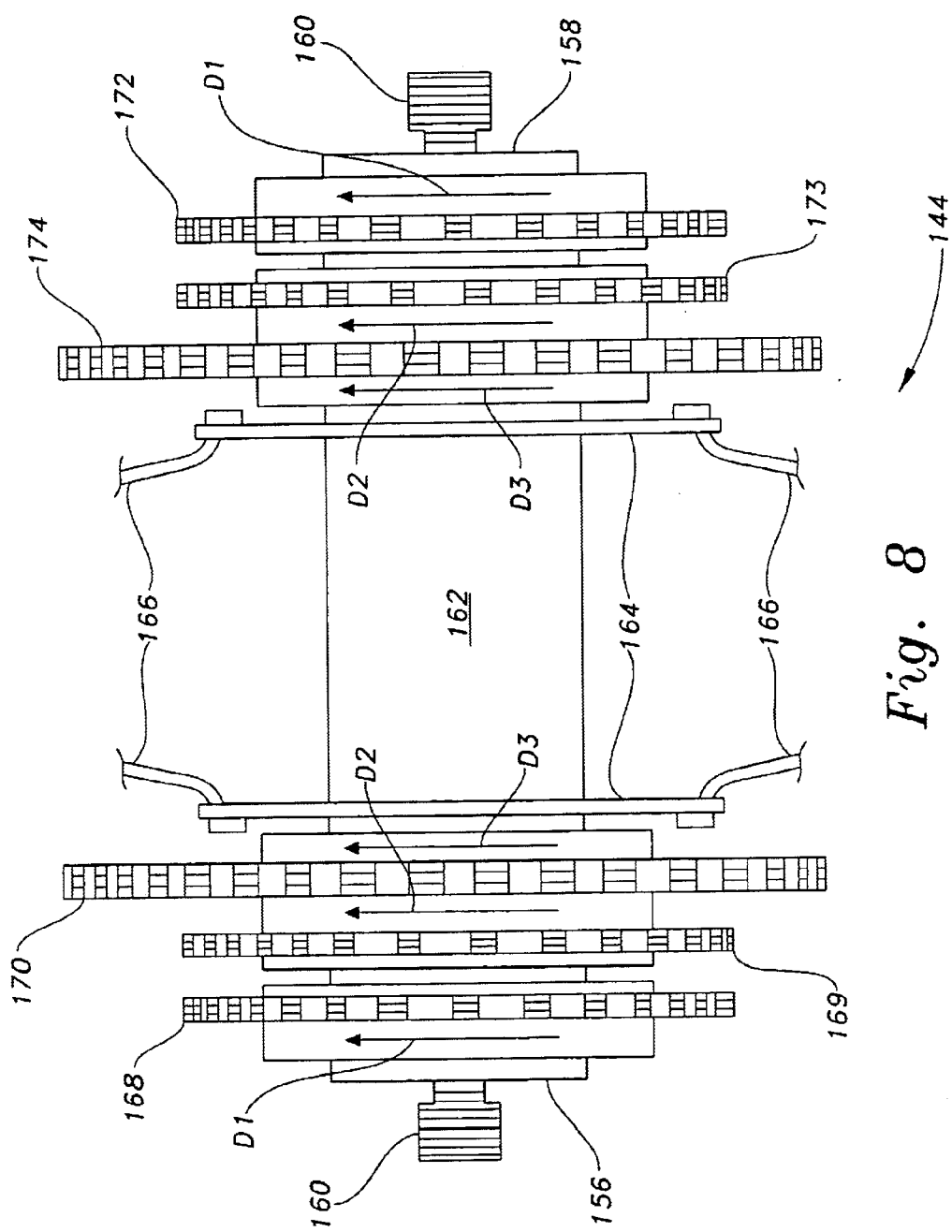
FIG. 8 is a rear elevation view of the multiple sprocket, one way drive rear wheel hub of the present mechanism.

The above described tension member runs serve to provide a reciprocating action of the tension member throughout the runs, including their respective wraps about the sprockets of the rear wheel hub assembly 144. Accordingly, the rear wheel hub assembly 144 includes one way drive means in order to use the reciprocating motions of the tension members of the present mechanism as noted further above. FIG. 8 provides a rear elevation view of the rear wheel hub assembly 144 of the present invention.

The hub assembly 144 of FIG. 8 includes sprocket sets on both the left side 156 and opposite right side 158 thereof, unlike a conventional rear wheel hub having only a single sprocket. Conventional hub attachment means 160 extend to each side 156 and 158 of the hub assembly 144. A wheel hub center 162, with spoke carriers 164 and spokes 166, is disposed between the two ends 156 and 158 of the hub assembly 144. The left side 156 of the hub assembly 144 includes first through third sprockets, respectively 168 through 170, while the opposite hub side 158 includes respective first through third right side sprockets 172 through 174.

While the two outermost sprockets 168, 169 and 172, 173 on each side of the assembly 144 are the same diameter and tooth pitch, the innermost sprocket 170 and 174 on each side is of a larger diameter with a greater number of teeth. These larger sprockets 170 and 174 are optional, and need not be provided if not desired. However, they provide yet another means of adjusting the effective ratios of the present pedal powered device, as is known with conventional gear change mechanisms for bicycles. The single larger diameter sprockets 170 and 174 of the assembly 144 of FIG. 8, would provide greater torque (at the expense of speed) for the rearward stroke of each pedal arm. It will be seen that a second sprocket of the same diameter and pitch may be provided, to provide equal ratios on both the forward and rearward strokes, if so desired. However, the present infinitesimally adjustable ratios provided for the forward and rearward strokes, and for the effective length of the pedal arms, provide considerable latitude in adjusting the overall mechanical ratios of the present mechanism in any event. Thus, the sprockets may be provided in only a single size, with the present mechanism still providing the mechanical efficiencies of the variable ratios. Pulleys or rollers may be substituted for sprockets when cable tension members are used.

All of the sprockets 168 through 174 are provided with some form of one way drive means, such as conventional ratchet, cam and roller, or sprag clutch arrangements as known in the art of one way rotary drives. The first sprocket on each side, respectively 168 and 172, provide driving force in the direction of the upward drive arrows D1, with the sprockets 168 and 172 freewheeling without engagement when rotated in a direction opposite the arrows D1. In other words, the left side first sprocket 168 engages to drive the rear wheel when rotated in a counterclockwise direction when viewed from the left side of the cycle, while the right side first sprocket 172 engages to drive the rear wheel when rotated in a clockwise direction when viewed from the right side of the cycle.

The left and right side second sprockets 169 and 173 include one way drive means engaging in the same direction of rotation as the first sprockets 168 and 172, as indicated by the directional arrows D2. Thus, as the tension members wrap about both sprockets on each side of the hub assembly 144, it will be seen that a positive driving force is imparted to the hub assembly 144 regardless of the direction of travel of the pedal arms, as either the first sprockets 168 and 172 are imparting a driving force upon forward motion of the pedal arms, or the second sprockets 169 and 173 are imparting a driving force upon rearward motion of the pedal arms. The larger diameter innermost sprockets 170 and 174 operate in the same manner, imparting rotational force to the hub assembly 144 when rotated in the direction of the third arrows D3.

In any event, regardless of the sprocket or pulley sizes and their arrangement relative to the center of the hub assembly, the one way clutch means used are always installed to cause engagement in the same direction, as indicated by the parallel directional arrows D1 through D3 in FIG. 8. It will be seen that the above described direction of rotation imparted by the sprockets, may be easily reversed by turning the hub 144 (and attached wheel) around, i. e., reversing their left and right sides relative to the frame F, if so desired.

Each of the above described sprockets or pulleys 168 through 174, and their separate one way drive clutches, are independent of one another, other than being assembled along the same axis. It will thus be seen that the right side tension member 116 and left side tension member 117 (a section of which is shown in FIG. 3 of the drawings) may respectively operate any of the right side sprockets or pulleys 172 through 174 or any of the left side sprockets or pulleys 168 through 170, independently of one another. In other words, any driving action, in either the forward or the rearward stroke, of the right side pedal arm 94, is completely independent of the operation of the unshown left side pedal arm of the present mechanism. Thus, both pedal arms may be driven forwardly or rearwardly together, or alternatingly relative to one another, completely independently, as controlled by the operator.

It will be noted that the effective length of the tensioner member 116 will always vary as the pedal arms 94 swing back and forth, and as adjustments are made to the ratios of the mechanism. Accordingly, some means must be provided to allow for this variation in length of the tensioner member. The movable idler pulley 146, with its position defined by the forward wrap of the doubled tension member segments 116f through 116i in FIGS. 6A and 6B (or 116q through 116t in FIGS. 7A and 7B) and by the tension adjuster spring or other tensioner 152, serves to provide the required tension on the tension member 116 regardless of the precise tension member path and orientation of the plate assembly 10. The longer tension member run of FIGS. 6A and 6B is compensated for by the extended spring 152 and rearwardly repositioned idler pulley 146, in comparison to FIGS. 7A and 7B.

Figure 10:
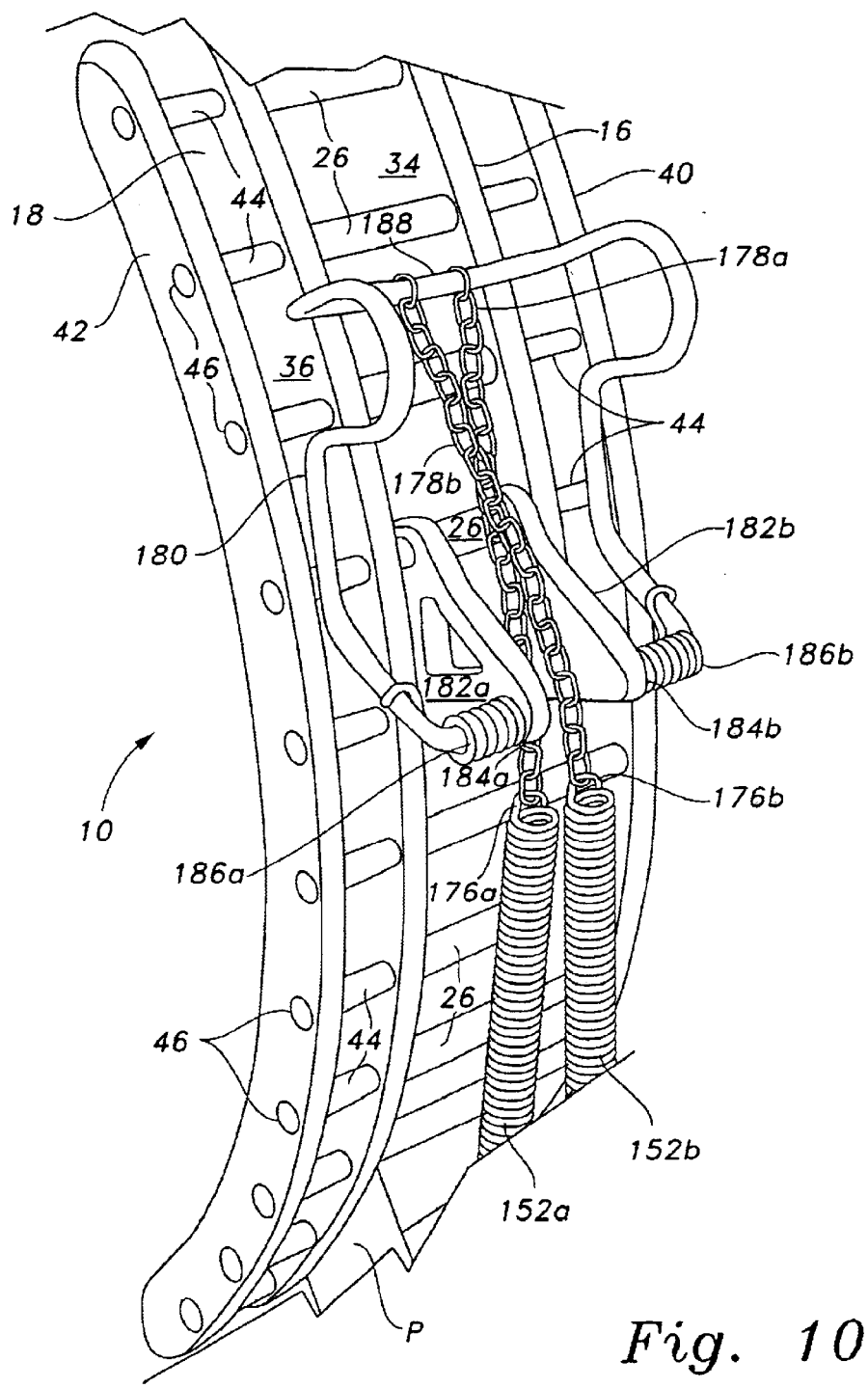
FIG. 10 is a broken away detailed perspective view of the means for adjusting and locking the spring tension for the tension members.

FIG. 10 of the drawings illustrates the means used for locking and securing the upper or attachment end of the spring or other tensioner device to the pedal arm adjuster plate assembly. While to this point only the single mechanism of the right side of the bicycle B or pedal powered device has been shown and described, FIG. 10 shows both the right and left side adjuster springs 152a and 152b, with their upper or attachment ends 176a and 176b being connected to a corresponding pair of chains or other flexible members 178a and 178b. (The two chains 178a and 178b are shown crossed over one another in FIG. 10, but this is not critical, as the tensioner latch means acts simultaneously on both chains 178a and 178b and their respective springs or tensioners 152a and 152b.)

The two chains 178a and 178b are in turn linked to an over center latch device 180, which is pivotally installed on a pair of attachment brackets 182a and 182b. The brackets 182a and 182b are in turn immovably affixed to the peripheries 34 and 36 of the two pedal arm adjuster plates 16 and 18, and their respective left and right pedal arm retainers 40 and 42, by means of the spacers 26 and 44 and their fasteners 46 which are used to secure the plates 16 and 18 and their corresponding pedal arm retainers 40 and 42 together. The two pivot ends 184a and 184b of the latch 180 are pivotally secured to the respective brackets 182a and 182b, with each latch pivot end 184a, 184b and corresponding bracket 182a, 182b having a spring, respectively 186a and 186b, urging the handle end 188 of the latch bar 180 toward the plate assembly 10 and away from the two tensioner springs 152a and 152b.

The above described assembly provides for easy and rapid loosening and tightening of the tension of the two tensioner springs 152a and 152b, and thus the two tension members 116 and 117 secured thereto, for relocating the tension members 116 and/or 117 about different sprockets on the hub assembly 144, or perhaps relocating the attachment ends of the tension members 116 and 117 (e. g., attachment end 143 of the chain 116 shown in FIG. 3) to the pedal arm adjuster 100, rather than being affixed to the adjuster plate 18. The two chains 178a, 178b may be sufficiently long as to provide a wide range of positional adjustment for the spring ends 176a, 176b to avoid any need to adjust the length of the tension members 116, 117 or necessitate several tension members having a series of different lengths. The additional chain lengths may be run downwardly into the hollow center of the tensioner elements 152a and 152b, defined by their coiled structure, for storage and to avoid entangling any free length of the chains in any of the mechanism of the present machine. Other alternative mechanisms may also be used, as desired.

As noted further above, the present mechanism provides for the infinitesimal adjustment of the effective mechanical ratios of the forward and rearward motions of the pedal arms and the effective lever arms of the two pedal arms through a predetermined range, thus enabling the rider or operator to select the precise mechanical ratio desired for the given conditions. The forward and rearward mechanical ratios may be adjusted independently of one another, if so desired, to provide different ratios for forward and rearward pedal arm movement.

The mechanism for accomplishing this adjustment was discussed in detail further above, in the portion of the present disclosure relating to FIGS. 2 and 3 of the drawings. In those Figures, the first and second threaded adjusters 54 and 72, for adjusting respectively the rearward and forward action of the pedal arms, were disclosed, along with an exemplary adjustment slide 114 in FIG. 3. The rotation of the threaded shafts 54 and 72, and also the threaded pedal shaft 96, was described for adjusting the relative positions of the respective adjuster slides 114 and 154 (shown schematically in FIGS. 5 and 6), and 100 therealong.

The resulting selective repositioning of the various slides along their respective threaded shafts produces a corresponding change in the length of the arm of the pedal shaft tension member attachment, as well as the length of the arm (distance) of the first and second adjuster slides from the pedal attachment point on each plate assembly. Accordingly, moving these adjuster slides closer to the pedal attachment point shortens their respective lever arms and results in a greater mechanical advantage, i. e., less force but greater movement of the pedal arms being required to accomplish a given degree of rotation of the rear hub assembly and its attached wheel. Conversely, movement of the various attachment slides outwardly along their respective adjusters lengthens their respective lever arms and results in a lesser mechanical advantage, requiring more force and less movement of the pedal arms for a given degree of rotation of the rear hub and wheel.

As the gear ratios of all the first adjuster transfer gears 56a through 56e, and the unshown left side first adjuster bevel gear corresponding to the right side first adjuster bevel gear 56e are 1:1, the number of rotations of both the right side threaded shaft 54 and opposite left side threaded shaft are the same for any actuation, thus positioning their respective adjusters at the same relative positions.

In a like manner, the left side threaded adjuster also transfers rotational input to the unshown left side pedal adjuster, by means of a mirror image arrangement to the transfer assembly 74, 76, 78, and 106 shown in FIG. 3 of the drawings. Again, the gear ratios are preferably 1:1, in order to provide the same number of rotations of both the right side pedal adjuster shaft 96 and its counterpart on the left side of the mechanism.

Actuation of only the right side adjuster shaft 54 does nothing to change the adjustment of the second threaded adjuster shaft 72, as this shaft 72 and its actuator for adjusting the mechanical ratio of the forward stroke of the pedal arm 94 are controlled by the transfer shaft 64 of the first adjuster assembly 50, by the transfer cable 70. The first adjuster transfer shaft 64 does not rotate with the first adjuster threaded shaft 54. Thus, the adjustment of the rearward stroke of the pedal arms is achieved by rotation of the left and right side first threaded shafts, with separate and independent adjustment of the forward stroke of the pedal arms accomplished by the independent rotation of the threaded left and right side second adjuster shafts by means of their corresponding unthreaded first adjuster transfer shafts and transfer cables, e. g., the unthreaded first adjuster shaft 64 and transfer cable 70 shown in FIGS. 2 and 3 for the right side assembly. Rotational motion for the unthreaded first adjuster shafts is provided by the second motor 68 and its corresponding gear train 66a through 66e.

The present adjustment system adjusts the first adjusters and the pedal arm adjusters simultaneously, due to the linkage between the threaded first adjuster shafts and pedal arm adjuster shafts described further above and shown in FIGS. 2 and 3. However, the pedal arm adjusters may be adjusted separately from the first adjusters, if so desired. This is achieved by engaging the first adjuster motor 58 to position the pedal arm adjusters as desired, then disconnecting the linkage between the first adjusters and the pedal arm adjusters, e. g., the pedal adjuster cable 106 shown in FIG. 3. The first adjusters may then be adjusted, with the position of the pedal arm adjusters remaining fixed.

The present inventor's U.S. patent application Ser. No. 09/208,276 disclosed mechanical means for rotating the various threaded adjuster shafts 54, 72, and 96 of the mechanism to adjust the mechanical ratios. The mechanical means essentially comprises a series of rollers which may bear selectively against the front wheel FW of the bicycle B, which in turn rotate a corresponding series of cable drives for rotating the adjuster shafts 54, 72, and 96 as controlled by the operator. However, the present invention provides an alternative electrical means for providing the rotation of the various adjuster shafts 54, 72, and 96, thus precluding need for any additional mechanism to provide such rotation.

A pair of electric motors 58 and 68 are shown installed between the two pedal arm adjuster plates 12 and 14 in FIG. 2 of the drawings, with the two motors 58 and 68 drawing electrical power from an electrical cell(s) and/or battery/batteries 138, which may be stored within a portion of the frame F as shown in FIG. 9 of the drawings. The two motors respectively drive roller drives 56d and 66d, which respectively drive worm gears 56c and 66c of the transfer gear assembly 62. The actuation of the first motor 58 rotates the first worm drive 56c to rotate the two bevel gears 56b and 56e extending therefrom, thereby rotating the right side adjuster shaft 54 by means of its attached bevel gear 56a, and the unshown corresponding left side assembly. Actuation of the adjuster shaft 54 also rotates the pedal arm adjuster shaft 96 to adjust the effective lever arm of the pedal shaft 94 (shown in FIG. 3 of the drawings), by means of the transfer cable 74 and gears 76, 78, as shown in FIG. 2 of the drawings.

Actuation of the second motor 68 rotates the second worm shaft 66c, thereby rotating the two bevel gears 66b and 66e to rotate the unthreaded right side shaft 64 by means of the gear 66a, and its unshown opposite left side counterpart. This shaft 64 imparts rotary motion to the opposite adjuster mechanism by means of the transfer cable 70, which rotates the second threaded adjuster shaft 72. As the two motors 58 and 68 are reversible, adjustment of any of the adjuster slides 100, 114, and/or 154 may be achieved in either direction along their respective threaded drives 54, 72, and/or 96 as desired.

The two motors 58 and 68 are controlled by a corresponding pair of double pole switches, respectively 190 and 192, affixed to the left and right handlebars L and R of the cycle B or pedal powered device, generally as shown in FIG. 1 of the drawings. These switches may be toggle, rocker, or any other suitable type of switch desired. Preferably, each switch 190 and 192 is a double pole switch, in order that levering or toggling the switch action in opposite directions results in rotation of the corresponding motor in opposite directions. Alternatively, separate switches could be provided for each direction of rotation of each motor, if so desired. The switches 190 and 192 communicate with the motors 58 and 68 and electrical power source 138 by means of a conventional wiring harness 194, portions of which are visible in various drawing Figures.

As an example of the adjustment which may be achieved by the present mechanism, let us assume that it is desired to increase the pedal effort required per pedal arm stroke, thus providing greater travel of the tension member per unit of arcuate pedal arm movement. This requires that the first adjuster 114 be repositioned further away from the pedal arm pivot point 28 of the right plate assembly 14. With right hand threaded adjuster shafts, the threaded first adjuster shaft 54 must be rotated in a counterclockwise direction, when viewed from the transfer cable 74 end. Assuming that the roller drives 56*d* and 66*d* of the two motors 58 and 68 have right hand threads, the first motor 58 must be turned in a clockwise direction to rotate the corresponding worm drive 56*c* counterclockwise, with the engagement of the two bevel gears 56*a* and 56*b* resulting in clockwise rotation of the threaded shaft 54 when viewed from the bevel gear 56*a* end, or counterclockwise when viewed from the opposite end. This causes the adjuster slide 114 to travel along the shaft 54 toward the bevel gear assembly 62, thus lengthening the arm provided and increasing the travel of the tension member 116 for a given amount of pedal arm travel. Reversal of the direction of rotation of the motor 58 by actuating the control switch in the opposite direction, results in reversal of the direction of travel of the adjuster slide 114 along the first adjuster assembly 50. It will be seen that the motor 58 and/or switch may be wired to provide the desired direction of rotation depending upon the direction of actuation of the switch, as desired.

Adjustment of the second adjusters for adjusting the mechanical ratios of the forward pedal arm strokes, e. g., the threaded shaft 72 of the right side adjuster 52, is remotely accomplished by activating the second motor 68 as desired. As in the case of the first adjusters and their drive from the first motor 58, adjustment may be made to either increase or decrease the mechanical advantage or force required of the operator, depending upon which way the corresponding electrical switch is operated and how the switch and motor are wired. Clockwise and counterclockwise rotation of the various rotating components is similar to that described above for the adjustment of the first adjuster slide 114, with the motor 68 rotating the worm drive 66*c* in the same direction (as viewed from above), with the bevel gear 66*a* also rotating in the same direction due to its placement to the opposite side of the corresponding input gear 66*b* as compared to the arrangement of the gear train comprising gears 56*a* through 56*d*. Thus, clockwise rotation of the motor 68 shaft results in clockwise rotation of the threaded shaft 72 (as viewed from the transfer cable 70 end), causing the corresponding adjuster slide 154 to thread its way upwardly along the shaft 72, toward the pedal shaft pivot point 28, to shorten the tensioner member travel with any given travel of the pedal arm. It will be seen that reversal of the direction of travel of the slide 154 may be achieved by reconfiguring the relationship between the various gears, or providing a left hand thread for the shaft 72 or worm and roller 66*d* and 66*c*, if so desired. However, the use of double pole switches 190 and 192 for actuating the two motors 58 and 68, allows the motors to be operated without regard to rotational direction by wiring the switches to the motors as desired, to achieve the desired travel direction of the slides in accordance with the desired direction of actuation of the switches.

It will be seen that the above described mechanism may incorporate various alternative configurations and components to those discussed above, if desired. For example, no guards or the like have been disclosed in the drawing figures, in order to provide clear and unimpeded views of the various functional components of the mechanism. Such guards could be provided over the outer portions of the plate assembly 10, to preclude loose clothing or other articles being caught in the mechanism.

Also, the stops 48 at the ends of the two pedal arm retainers 40 and 42, may be replaced with some resilient means (springs, etc.). This would return any impact energy to the pedal arm, thus easing the work of the operator of the mechanism. The pedal arms may also be spring biased forwardly or rearwardly to alter the force distribution patterns of the pedal strokes, and/or the pedal arms may be bent rearwardly to allow more rearward thrust.

It is also possible to use some other means for changing the mechanical ratios of the mechanism, than the electrically powered means disclosed further above. For example, pneumatic actuation of the various slides could be provided. The hollow tubular frame F of a conventional bicycle B, or other pedal powered device incorporating at least some hollow tubular structure, could be used to store air (or other actuating gas) under pressure, for the operation of pneumatic motors driving the ratio adjuster slides. Pneumatic pressure could be provided by a hand pump before or during operation of the device, or a pneumatic pump driven by rotation of one of the wheels of the device, as desired.

The present mechanism could alternatively utilize hydraulic adjuster actuation means, if so desired. As in the case of pneumatic actuation means, some energy must be provided in order to provide the hydraulic pressure required for operation. This may be achieved by means of an accumulator (pneumatic, mechanical spring, etc.), a hand or wheel driven pump, etc., as desired.

It will be noted that additional mechanical linkages may be included with the above described mechanism, to provide additional variations in the mechanical advantage to the operator and/or to the pedal travel paths. For example, pulleys (not shown) may be installed to the inner side of each of the pedal arms, with the pulleys each having a circumference equal to the arcuate length of their respective lower arcuate edge 34 and 36 of the pedal arm attachment plate assembly 10. The pulleys may be secured to the pedal arms so that their circumferential edges are immediately adjacent to and coplanar with the pedal arm guide track defined by the lower portion of each plate 16 and 18, and its corresponding pedal arm retainer or guide 40 and 42.

A flexible tension member (cable, roller chain, etc., not shown) may be installed to extend from one end of each pedal arm track to wrap around the corresponding pulley and continue to the opposite end of the pedal arm track, with the tension member being tightened to preclude any significant slack therein. Pedals, such as the articulated pedals 196 of the mechanism of FIGS. 1 and 4 through 6, may be installed outboard of each pulley. The above described configuration will be seen to provide a synchronized pulley arrangement, with each pulley producing one complete revolution with each complete stroke of the corresponding pedal arm.

Other arrangements may be constructed, generally based upon the above described alternative. For example, it will be noted that a specific radial line along each pulley will be aligned with its corresponding pedal shaft at each end of the pedal shaft travel, in the above described configuration. An additional shaft (not shown) may be installed at some point along this line on the inner surface of each pulley, with the opposite distal end of each shaft including a slide (not shown) which is captured upon its corresponding pedal arm, with an articulated pedal extending outwardly from the corresponding slide. This arrangement allows the effective rotational action of each of the pedals, to have a radius which is greater than the length of its pedal arm. The effective pivot point may extend well into the body of the operator of the mechanism, or may be adjusted so that the effective pivot point is between the hip joints of the operator, thus permitting the operator to use relatively stiff legged pedal strokes when the plate assembly 10 has been adjusted to its lowermost and rearwardmost position, as shown by the assembly 10a of FIG. 5.

A further alternative of the above synchronized pulley arrangement, comprises the installation of a secondary shaft (not shown) having a pedal installed thereon, extending from a shaft which is pivotally hinged to the pedal arm. It will be seen that this alternative does not provide a single effective pivot point for the attached pedal, as pedal movement will not be parallel to the axis of the pedal arm.

Yet another alternative comprises the addition of a secondary pedal arm extension pivotally attached or hinged to the primary pedal arm, e. g., pedal arm 94. Rather than securing the ends of the tension member 116 to a slide which is adjustably affixed to the pedal arm, as in the case of the pedal arm adjuster slide 100, pulleys or sprockets (as applicable) may be installed at some intermediate point along the pedal arm to serve as guides for the tension member. The tension member is routed past these guides, to extend to attachment points on the pedal arm extension. Additional pulleys or sprockets as required may be added to the pedal arm assembly for routing and alignment of the tension members, as required. It will be seen that the pedal arm extension attachment points for the tension member may be provided with adjustability, similar to the threaded pedal arm shaft 96 and its cooperating pedal arm adjuster slide 100, shown in FIG. 3 of the drawings. This arrangement allows the pedals to actually extend to the surface, if so desired. The pedals may be provided with rollers, somewhat like in-line skates, with the rollers being ratcheted to allow the operator to "walk" the surface while seated on the cycle.

In the above configuration, all forces applied to the pedal arm extension are transferred directly to the rear wheel hub assembly 144, by means of the primary tension members routed from the pedal arm extension, around the hub, and back to the extension. This configuration provides a potential variety of motion patterns, including circles, ellipses, radial pumping action at all arcuate positions of the pedal arms, and various combinations thereof.

Figure 11:
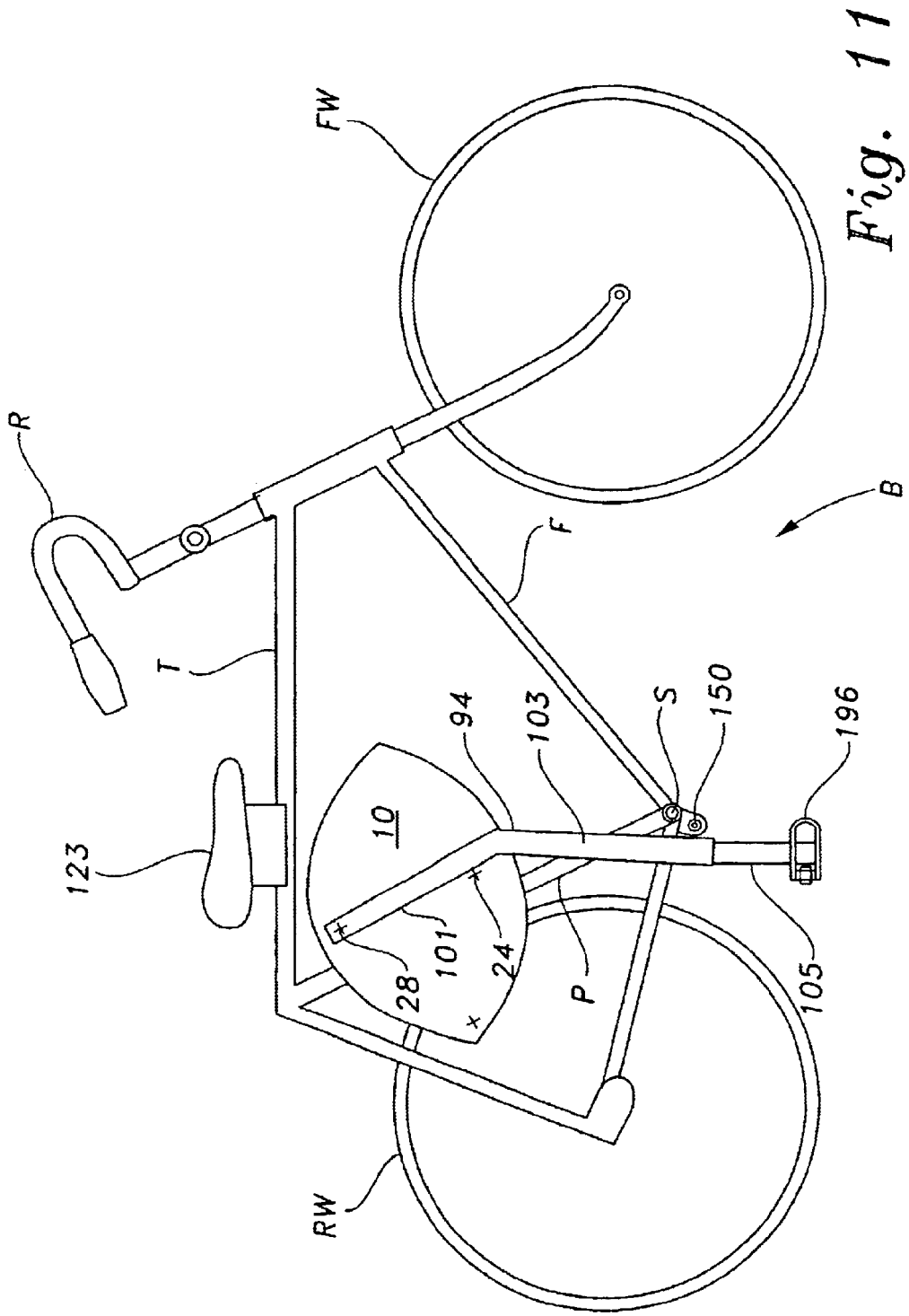
FIG. 11 is a right side elevation view of a bicycle incorporating the present adjustable drive mechanism, showing the pedal arms downwardly extended to support a stationary bicycle.

The pedal arm 94 configuration of the present mechanism or device, allows the lower arm extensions 105 to be extended from the lower arm channels 103 to contact the ground or underlying surface on each side of the bicycle B, with the pedals 196 resting upon the underlying surface, as shown in FIG. 11 of the drawings. The extended lower extensions 105 and their attached pedals 196 act as lateral supports for the bike B, thus precluding any requirement for a separate kickstand or other support means for the stationary bike B. The lower arm extensions 105 are selectively extended and retracted as desired by means of the semicircular channels 109 formed in the back of the extensions 105 and cooperating pin 113 which engages the channels to lock or unlock the extensions 105 in place within their respective lower arm portions 103, as illustrated in FIG. 4 of the drawings and discussed further above.

Figure 12:
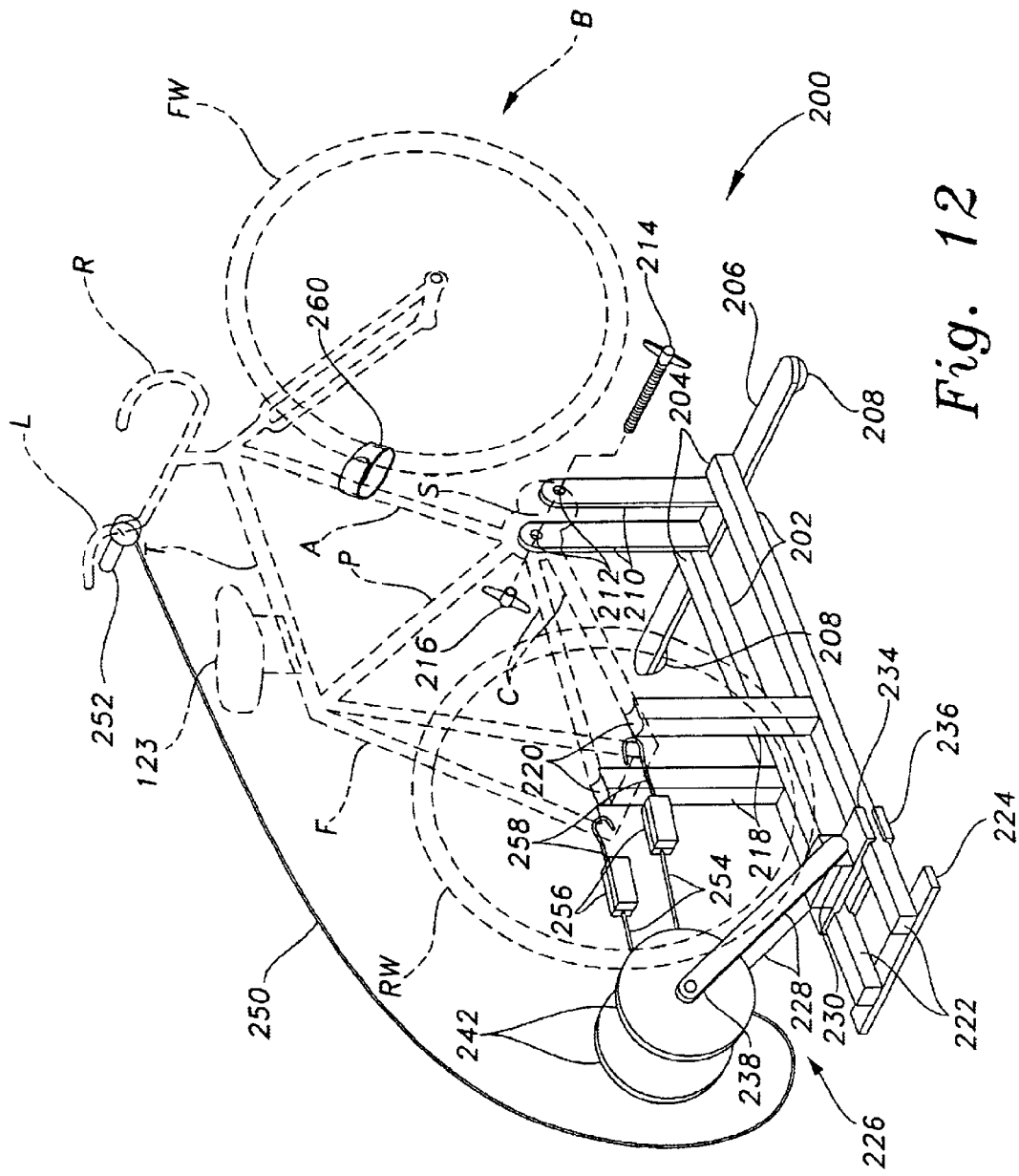
FIG. 12 is a right side perspective view of an alternate embodiment of the present invention, illustrating a stationary stand providing for a bicycle equipped with the present mechanism to be used as a stationary exercise bike.

The above described mechanism is also adaptable for use with a stationary pedal powered device as an exercise machine. FIGS. 12 and 13 show a support stand 200 for supporting a generally conventional bicycle B which has been modified in accordance with the bicycle B of FIGS. 1 through 11. The stand 200 provides for the rigid and stationary securing of the cycle B frame therein, and also provides for rotation of the rear wheel RW. Braking means is also provided for the rear wheel RW, to increase the effort required of a person using the present exercise device comprising the bicycle B, its adjustable pedal mechanisms (not shown in FIG. 12, but essentially identical to the mechanism discussed above and illustrated in FIGS. 1 through 11), and the associated stand 200.

The stand 200 includes a pair of spaced apart elongate base members 202 upon which the various adjustable and operational components of the stand 200 are installed. The first ends 204 of the base members 202 has a lateral stabilizer bar or support 206 extending thereacross, with an optionally adjustable pad, foot, etc. 208 depending from each end thereof. An upright first end brace 210 extends upwardly from the first end 204 of each base member 202, with the braces 210 being correspondingly spaced and E generally vertically disposed. The upper end of each brace 210 includes a bicycle securing passage 212 therethrough, providing for the removable installation of a threaded pin or the like 214 therethrough and through the open pedal arm sleeve S of the bike B, to secure the bike B to the stand 200. A cooperating fastener 216 (wing nut, etc.) is used to lock the pin 214 and bike B in place.

Another support or brace 218 extends upwardly generally medially from each of the base members 202, and are spaced apart to generally straddle the rear wheel RW of the bike B. Each of these braces 218 has a concave saddle 220 formed in its upper end, with the rear wheel brace or chain stay tubes C or structure of the bike B resting in these saddles 220 slightly forward of the rear wheel hub when the bike B is installed in the stand 200. The two rear wheel support braces 218 are sufficiently high as to provide clearance between the rear wheel RW of the bike B and the underlying structure, when a bike B is placed in the stand 200.

The rearward ends 222 of the two base members 202 includes another lateral support arm 224 thereacross, which also serves tog space the two base members 202 properly from one another. A brake mechanism 226 is adjustably secured to the rearward portions 222 of the base members 202, to provide braking resistance for the rear wheel RW of the bicycle B when operated in the stand 200.

FIG. 13 provides a detailed view of the brake mechanism 226. The brake mechanism 226 includes a pair of laterally spaced apart brake arms 228 which extend from a mounting block assembly 230. A conventional lateral pivot axle (not shown) extends across the block assembly 230, with the arm attachment ends 232 secured to the unshown axle which is in turn captured in the mounting block assembly 230. The mounting block assembly 230 is in turn secured to the upper plate of an upper and lower attachment plate assembly, respectively 234 and 236, which permits the brake mechanism 226 to slide adjustably along the two base members 202 as desired.

Each brake arm 228 has a distal end 238 with a rotating brake assembly secured therebetween. The brake assembly includes a drum 240, which bears frictionally against the drive wheel (e. g., the rear wheel RW) of the pedal powered mechanism secured to the stand 200. A relatively larger diameter brake disc 242 extends from each side or end of the wheel drum 240. The two brake arms 228 include a brace 244 extending therebetween, with a brake actuator plate 246 extending generally radially therefrom, between the two brake discs 242. A double acting brake cylinder 248 is secured to the plate 246, with the two ends of the cylinder 248 extending to bear frictionally against the facing surfaces of the two brake discs 242 when the brake is actuated. The brake cylinder 248 may be operated by means of pneumatic pressure from a pneumatic line 250 extending between the brake cylinder 248 and a hand operated pneumatic brake actuator and pressure gauge 252 located remotely from the brake cylinder 248, e. g., on the left handlebar L of the bike B, generally as shown in FIG. 12 of the drawings. The brake actuator and gauge 252 may be essentially the same device as that used in the operation of the brake means for the exercise stand of the 09/208,276 patent application by the present inventor, or other suitable device. Accordingly, the gauge may be calibrated in units of pressure, or alternatively, since the pressure in the system is proportional to the brake drag produced, the gauge 400 may be calibrated in units of drag force, or perhaps in degrees or percentage of a slope to indicate the virtual steepness of a slope simulated by the increased brake drag. A conventional one way check valve (not shown) may be used to hold pressure in the system, to preclude the necessity for the operator to continually apply pressure to the device for constant braking effect. Other alternative brake control means (mechanical, hydraulic, etc.) may be provided as desired.

The pneumatic brake actuation system is used by the operator. of the cycle B mounted on the stand 200, selectively increasing the pressure in the brake system by pumping the pneumatic device 252 until the desired braking resistance is achieved. Alternatively, the operator may increase pressure in the system until a desired indication is reached on the gauge (pressure, braking resistance, simulated grade or slope, etc.). Any excessive pressure may be adjusted or released by means of the conventional release valve provided with the assembly. Alternative braking means may be provided, e. g., electrical generation, with control of the field coils by a remotely located controller for access by the operator, or hydraulic means, etc., as desired. Conventional heat dissipation means may be provided for any of the alternative braking systems.

The stand 200 is particularly well adapted for use with a cycle B having the adjustable pedal mechanism of FIGS. 1 through 11, and described in detail further above. That mechanism provides electrically powered means for adjusting the effective mechanical ratios for the forward and rearward strokes of the pedal arms. The above described stand 200, with its means for supporting the cycle B, providing for adjustment of the mechanical ratios of the cycle B by the operator, and for increasing the workload of the operator by means of the braking system described above, is of great value for a person desiring an accurate simulation of cycling while indoors. The stand 200 is easily readied for installation of the cycle B, by leveling the stand 200 as required by means of the threaded adjustments 208 (FIG. 12) and installing the cycle B therein. (Similar leveling means, not shown, may be provided at each end of the base extension 224.)

The cycle B is then placed within the stand 200, with the lower rear or chain stay structure C to each side of the rear wheel RW resting in the saddles 220 formed in the upper ends of the two medially disposed uprights 218 of the stand 200. The pedal shaft bushing crossmember or pin 214 is then inserted through one of the upright or support passages 212 and the otherwise empty pedal shaft bushing sleeve S of the cycle (the conventional pedal assembly having been previously removed, with installation of the adjustable pedal drive mechanism discussed further above and shown in FIGS. 1 through 11), and the opposite support passage 212. Alternatively, it will be seen that a separate or different lateral passage, sleeve, or bushing (not shown) may be provided specifically for the installation of the crossmember or pin 214 in lieu of using the conventional lateral pedal shaft bushing, if so desired. The crossmember or pin 214 is threaded at one end thereof, and engages a mating threaded retainer 216 (e. g., wing nut, etc.), as shown in FIG. 12. The otherwise free front wheel FW is secured in a generally straight ahead position to maintain a like position for the handlebars L and R, by securing a strap 260 (e. g., cooperating hook and loop material, snaps, etc.) around the lower front frame member A and the front wheel FW.

The brake assembly 226 is then pivoted upwardly and forwardly so the wheel drum 240 (shown in FIG. 13) bears against the driven wheel (e. g., rear wheel RW) of the cycle B, generally as shown in FIG. 12 of the drawings. The brake assembly 226 is held in position by a pair of tensioners 254 disposed to each side of the rear wheel RW. Each tensioner 254 includes a conventional over center latch 256 with a distal hook 258 extending from each latch 256 to hook around the rear frame structure of the cycle B adjacent the drive wheel hub thereof, generally as shown in FIG. 12. The hooks 258 of the two tensioners 254 are threaded for adjustment of their extension from their respective over center latches 256. The latches 256 are opened, the hooks 258 are adjusted as required and hooked around the frame of the cycle B, and the latches 256 closed to pull the wheel drum 240 tightly against the rear or drive wheel RW of the bike B.

This arrangement provides adjustment for a wide range of cycle frame sizes, as the frame F is only positively secured at one point (i. e., through the pedal shaft sleeve S), with the lower rear chain stay structure C merely resting atop the two medial supports 218. Thus, a cycle B of any practicable wheelbase may be used with the present stand 200, as only the lateral positioning of the chain stay structure C atop the two supports 218 is critical, and longitudinal positioning of this structure relative to the supports 218 may be adjusted or varied as required. The pivotally mounted configuration of the brake assembly 226 also adjusts for virtually any practicable drive or rear wheel RW diameter, as required.

The cycle B and stand 200 may then be used for stationary cycling exercise by the operator thereof. If a selectively variable workload is desired by means of selectively braking the operation of the rear wheel and tire RW of the cycle B, the operator need only clamp the brake control assembly 252 discussed above to one of the handlebars of the cycle, and connect the associated tubing 250 to the brake assembly 226 installed at the rear of the stand 200. The operator may then adjust the braking resistance as desired, while monitoring the associated gauge to determine the resistance or equivalent slope, etc. of the system. When the exercise is completed, the cycle B is easily removed from the stand 200 by removing the brake control assembly 252, loosening the two over center latches 256 and unhooking the brake assembly retaining hooks 258 from the frame F of the cycle, removing the front wheel retaining strap 260, and removing the lateral fastener or pin 214 from the forward uprights 210 and pedal shaft sleeve S, thereby readying the cycle B for actual cycling activities.

In summary, the present adjustable pedal drive mechanism for bicycles and other pedal powered devices, provides an advanced means of pedal operation for such devices. The arcuately reciprocating forward and upward, and rearward and downward, strokes of the pedal arms are much more efficient than the conventional circular pedal motions of conventional mechanisms. The provision for adjusting the limits of the swing of the pedal arms as desired provides the operator with further versatility. Moreover, the operator of the device may select precisely the mechanical ratio desired for the forward stroke, rearward stroke, and pedal arm independently of one another, as desired. The advantages of such a system are readily apparent for the cyclist who cycles over relatively long distances and/or variable terrain.

In addition, the above described stand for securing a cycle equipped with the present adjustable pedal mechanism, enables a cyclist to enjoy all of the benefits of an actual cycle ride while remaining stationary. The stand allows the driven wheel to rotate, thereby enabling the adjustable mechanical ratios of the pedal drive mechanism to be adjusted by the operator as desired and also providing adjustable braking means against the driven wheel for simulating a load (hills and slopes, etc.). Thus, the present stand enables a cyclist to enjoy all of the effects of a workout performed during an actual cycle ride, while the cycle is mounted in the stand for use as a stationary exercise machine. Yet, the cycle is easily installable in and removable from the stand in only a very few seconds, thus enabling the cyclist to easily convert the cycle for outdoor use or stationary use as desired. The benefits of the present system incorporating a cycle equipped with the present variable pedal drive mechanism and stand therefor, will be of great value to any serious cyclists who wish to enjoy their activity under all circumstances.

It is to be understood that the present invention is not limited to the embodiments described above, but encompasses any and all embodiments within the scope of the following claims.

I claim:

1. In a pedal driven device having a frame and at least one driven wheel, an adjustable pedal drive mechanism, including:
   a left and a right pedal arm each having a pivot end;
   each said pedal arm having a reciprocating arcuate travel path about a corresponding said pivot end, comprising a first stroke direction and opposite second stroke direction; and
   means for adjustably positioning said pivot end of each said pedal arm as desired, relative to the frame of the device including:
      a lateral pedal arm plate bushing affixed across the frame;
      a left side and an opposite right side pedal arm plate assembly affixed to one another and pivotally secured to the frame through said pedal arm plate bushing;
      each said plate assembly including a pedal arm attachment point, and a separate bushing attachment point for pivotally securing each said plate assembly to said pedal arm plate bushing of the frame; and
      said pivot end of said left and said right pedal arm being pivotally attached to said pedal arm attachment point respectively of said left and said right plate assembly.

2. The adjustable pedal drive mechanism according to claim 1, further including intermediate lateral bracing means for each said pedal arm.

3. The adjustable pedal drive mechanism according to claim 2, wherein said intermediate lateral bracing means for each said pedal arm, comprises:
   each said pedal arm having a generally intermediately positioned guide shoe disposed thereon;
   a left side and an opposite right side pedal arm plate assembly;
   each said plate assembly including a pedal arm attachment point and a lower arcuate edge with a pedal arm retainer spaced apart therefrom and extending therealong; and
   said pivot end of each said pedal arm being pivotally attached to said pedal arm attachment point of the corresponding said plate assembly, and said guide shoe of each said pedal arm being laterally captured between the corresponding said plate assembly, and pedal arm retainer for arcuately moving therebetween and for precluding significant lateral movement of each said pedal arm.

4. The adjustable pedal drive mechanism according to claim 1, further including means for driving the at least one driven wheel in a first direction of rotation during both said, first and said second stroke direction of each said pedal arm.

5. The adjustable pedal drive mechanism according to claim 4, wherein said means for driving the at least one driven wheel in a first direction of rotation during both said first and said second stroke direction of each said pedal arm, comprises:
   a hub having a left and a right side, disposed within the at least one driven wheel of the pedal driven device;
   a first and a second one way drive means disposed to each said side of said hub;
   a left and an opposite right tension member for mechanically connecting the corresponding said pedal arm with the corresponding said first and said second one way drive means; and
   each said first and said second one way drive means accepting rotary force and engaging with said hub of the at least one driven wheel in a first direction of rotation, and rotating freely and disengaging from said hub of the at least one driven wheel in a second direction of rotation opposite said first direction of rotation, for transmitting force from each said pedal arm to the at least one driven wheel in said first direction of rotation during both said first and said second stroke direction of each said pedal arm by alternatingly rotating each said first and said second one way drive means.

6. The adjustable pedal drive mechanism according to claim 1, further including:
   a hub having a left and a right side, disposed within the at least one driven wheel of the pedal driven device;
   one way drive means disposed to each said side of said hub;
   each said one way drive means rotationally engaging said hub independently of one another;
   a left and an opposite right tension member for mechanically connecting the corresponding said pedal arm with the corresponding said one way drive means; and
   means for increasing travel of each said tension member for each said stroke of each said pedal arm.

7. The adjustable pedal drive mechanism according to claim 6, wherein said means for increasing travel of each said tension member for each said stroke of each said pedal arm, comprises:
   each said pedal arm having a first and a second tension member roller thereon, for rotationally connecting the corresponding said tension member to each said pedal arm; and
   each said tension member passing around said first tensions member roller of the corresponding said pedal arm, thence continuing to the corresponding said one way drive means, thence returning and passing around said second tension member roller of, the corresponding said pedal arm, for increasing travel of each said tension member when the corresponding said pedal arm is operated.

8. The adjustable pedal drive mechanism according to claim 7, further including means for infinitesimally adjusting the effective stroke length of each said pedal arm relative to the corresponding said pivot end thereof through a predetermined range, by selectively adjusting the position of each said tension member roller along the corresponding said pedal arm.

9. The adjustable pedal drive mechanism according to claim 1, further including:
   a hub having a left and a right side, disposed within the at least one driven wheel of the pedal driven device;
   one way drive means disposed to each said side of said hub;
   each said one way drive means rotationally engaging said hub independently of one another;
   a left and an opposite right tension member for mechanically linking the corresponding said pedal arm with the corresponding said one way drive means; and
   each said one way drive means accepting rotary force and engaging with said hub of the at least one driven wheel in a first direction of rotation, and rotating freely and disengaging from said hub of the at least one driven wheel in a second direction of rotation opposite said first direction of rotation, for independently transmitting power from each said pedal arm to the at least one driven wheel according to selective operation of each said pedal arm as desired.

10. The adjustable pedal drive mechanism according to claim 1, further including means for infinitesimally adjusting the effective mechanical ratio of said first stroke of each said pedal arm through a predetermined range.

11. The adjustable pedal drive mechanism according to claim 1, further including means for infinitesimally adjusting the effective mechanical ratio of said second stroke of each said pedal arm through a predetermined range.

12. The adjustable pedal drive mechanism according to claim 1, further including means for infinitesimally adjusting the effective mechanical ratio of said first and said second stroke of each said pedal arm through predetermined ranges, independently of one another.

13. The adjustable pedal drive mechanism according to claim 1, further including electrically powered means for infinitesimally adjusting the effective mechanical ratio of at least said first and said second stroke of each said pedal arm through predetermined ranges.

14. The adjustable pedal drive mechanism according to claim 13, further including means for remotely controlling said electrically powered ratio adjusting means from the pedal driven device during operation thereof.

15. The adjustable pedal drive mechanism according to claim 1, further including:
   a hub having a left and a right side, disposed within the at least one driven wheel of the pedal driven device;
   one way drive means disposed to each said side of said hub;
   each said one way drive means rotationally engaging said hub independently of one another;
   a left and an opposite right tension member for mechanically connecting the corresponding said pedal arm with the corresponding said one way drive means; and
   means for automatically adjusting each said tension member for compensating for changes in the travel path thereof.

16. The adjustable pedal drive mechanism according to claim 1, including:
   a hub having a left and a right side, disposed within the at least one driven wheel of the pedal driven device;
   one way drive means disposed to each said side of said hub;
   each said one way drive means rotationally engaging said hub independently of one another;
   a left and an opposite right tension member for mechanically connecting the corresponding said pedal arm with the corresponding said one way drive means; and
   each said tension member being selected from the group consisting of roller chains and flexible cables.

17. The adjustable pedal drive mechanism according to claim 1, wherein each said pedal arm includes a selectively extendible and retractable distal portion.

18. The adjustable pedal drive mechanism according to claim 1, further including a stand for supporting the pedal driven device and for using the pedal driven device as a stationary exercise machine.

19. The adjustable pedal drive mechanism according to claim 18, wherein said stand includes means for adjusting for different pedal driven devices having different dimensions from one another.

20. The adjustable pedal drive mechanism according to is claim 18, wherein said stand includes means for selectively increasing rotational resistance for the at least one driven wheel of the pedal driven device.

21. In a pedal driven device having a frame and at least one driven wheel, an adjustable pedal drive mechanism, including:
   a left and a right pedal arm each having a pivot end;
   each said pedal arm having a reciprocating arcuate travel path about a corresponding said pivot end, comprising a first stroke direction and opposite second stroke direction; and
   intermediate lateral bracing means for each said pedal arm, including:
      each said pedal arm having a generally intermediately positioned guide shoe disposed thereon;
      a left side and an opposite right side pedal arm plate assembly;
      each said plate assembly including a pedal arm attachment point and a lower arcuate edge with a pedal arm retainer spaced apart therefrom and extending therealong; and
      said pivot end of each said pedal arm being pivotally attached to said pedal arm attachment point of the corresponding said plate assembly, and said guide shoe of each said pedal arm being laterally captured between the corresponding said plate assembly and pedal arm retainer for arcuately moving therebetween and for precluding significant lateral movement of each said pedal arm.

22. In a pedal driven device having a frame and at least one driven wheel, an adjustable pedal drive mechanism, including:
   a left and a right pedal arm each having a pivot end;
   each said pedal arm having a reciprocating arcuate travel path about a corresponding said pivot end, comprising a first stroke direction and opposite second stroke direction;
   intermediate lateral bracing means for each said pedal arm; and
   means for adjustably positioning said pivot end of each said pedal arm as desired, relative to the frame of the pedal driven device.

23. The adjustable pedal drive mechanism according to claim 22, wherein said means for adjustably positioning said pivot end of each said pedal arm relative to said frame of said pedal driven device, comprises:
- a lateral pedal arm plate bushing affixed across the frame;
- a left side and an opposite right side pedal arm plate assembly affixed to one another and pivotally secured to the frame through said pedal arm plate bushing;
- each said plate assembly including a pedal arm attachment point, and a separate bushing attachment point for pivotally securing each said plate assembly to said pedal arm plate bushing of the frame; and
- said pivot end of said left and said right pedal arm being pivotally attached to said pedal arm attachment point respectively of said left and said right plate assembly.

24. The adjustable pedal drive mechanism according to claim 21, further including means for driving the at least one driven wheel in a first direction of rotation during both said first and said second stroke direction of each said pedal arm.

25. The adjustable pedal drive mechanism according to claim 24, wherein said means for driving the at least one driven wheel in a first direction of rotation during both said first and said second stroke direction of each said pedal arm, comprises:
- a hub having a left and a right side, disposed within the at least one driven wheel of the pedal driven device;
- a first and a second one way drive means disposed to each said side of said hub;
- a left and an opposite right tension member for mechanically connecting the corresponding said pedal arm with the corresponding said first and said second one way drive means; and
- each said first and said second one way drive means accepting rotary force and engaging with said hub of the at least one driven wheel in a first direction of rotation, and rotating freely and disengaging from said hub of the at least one driven wheel in a second direction of rotation opposite said first direction of rotation, for transmitting force from each said pedal arm to the at least one driven wheel in said first direction of rotation during both said first and said second stroke direction of each said pedal arm by alternatingly rotating each said first and said second one way drive means.

26. The adjustable pedal drive mechanism according to claim 21, further including:
- a hub having a left and a right side, disposed within the at least one driven wheel of the pedal driven device;
- one way drive means disposed to each said side of said hub;
- each said one way drive means rotationally engaging said hub independently of one another;
- a left and an opposite right tension member for mechanically connecting the corresponding said pedal arm with the corresponding said one way drive means; and
- means for increasing travel of each said tension member for each said stroke of each said pedal arm.

27. The adjustable pedal drive mechanism according to claim 26, wherein said means for increasing travel of each said tension member for each said stroke of each said pedal arm, comprises:
- each said pedal arm having a first and a second tension member roller thereon, for rotationally connecting the corresponding said tension member to each said pedal arm; and
- each said tension member passing around said first tension member roller of the corresponding said pedal arm, thence continuing to the corresponding said one way drive means, thence returning and passing around said second tension member roller of the corresponding said pedal arm, for increasing travel of each said tension member when the corresponding said pedal arm is operated.

28. The adjustable pedal drive mechanism according to claim 27, further including means for infinitesimally adjusting the effective stroke length of each said pedal arm relative to the corresponding said pivot end thereof through a predetermined range, by selectively adjusting the position of each said tension member roller along the corresponding said pedal arm.

29. The adjustable pedal drive mechanism according to claim 21, further including:
- a hub having a left and a right side, disposed within the at least one driven wheel of the pedal driven device;
- one way drive means disposed to each said side of said hub;
- each said one way drive means rotationally engaging said hub independently of one another;
- a left and an opposite right tension member for mechanically linking the corresponding said pedal arm with the corresponding said one way drive means; and
- each said one way drive means accepting rotary force and engaging with said hub of the at least one driven wheel in a first direction of rotation, and rotating freely and disengaging from said hub of the at least one driven wheel in a second direction of rotation opposite said first direction of rotation, for independently transmitting power from each said pedal arm to the at least one driven wheel according to selective operation of each said pedal arm as desired.

30. The adjustable pedal drive mechanism according to claim 21, further including means for infinitesimally adjusting the effective mechanical ratio of said first stroke of each said pedal arm through a predetermined range.

31. The adjustable pedal drive mechanism according to claim 21, further including means for infinitesimally adjusting the effective mechanical ratio of said second stroke of each said pedal arm through a predetermined range.

32. The adjustable pedal drive mechanism according to claim 21, further including means for infinitesimally adjusting the effective mechanical ratio of said first and said second stroke of each said pedal arm through predetermined ranges, independently of one another.

33. The adjustable pedal drive mechanism according to claim 21, further including electrically powered means for infinitesimally adjusting the effective mechanical ratio of at least said first and said second stroke of each said pedal arm through predetermined ranges.

34. The adjustable pedal drive mechanism according to claim 33, further including means for remotely controlling said electrically powered ratio adjusting means from the pedal driven device during operation thereof.

35. The adjustable pedal drive mechanism according to claim 21, further including:
- a hub having a left and a right side, disposed within the at least one driven wheel of the pedal driven device;
- one way drive means disposed to each said side of said hub;
- each said one way drive means rotationally engaging said hub independently of one another;
- a left and an opposite right tension member for mechanically connecting the corresponding said pedal arm with the corresponding said one way drive means; and means for automatically adjusting each said tension member for compensating for changes in the travel path thereof.

36. The adjustable pedal drive mechanism according to claim 21, including:
a hub having a left and a right side, disposed within the at least one driven wheel of the pedal driven device;
one way drive means disposed to each said side of said hub;
each said one way drive means rotationally engaging said hub independently of one another;
a left and an opposite right tension member for mechanically connecting the corresponding said pedal arm with the corresponding said one way drive means; and
each said tension member being selected from the group consisting of roller chains and flexible cables.

37. The adjustable pedal drive mechanism according to claim 21, wherein each said pedal arm includes a selectively extendible and retractable distal portion.

38. The adjustable pedal drive mechanism according to claim 21, further including a stand for supporting the pedal driven device and for using the pedal driven device as a stationary exercise machine.

39. The adjustable pedal drive mechanism according to claim 38, wherein said stand includes means for adjusting for different pedal driven devices having different dimensions from one another.

40. The adjustable pedal drive mechanism according to claim 38, wherein said stand includes means for selectively increasing rotational resistance for the at least one driven wheel of the pedal driven device.

41. In a pedal driven device having a frame and at least one driven wheel, an adjustable pedal drive mechanism, including:
a left and a right pedal arm each having a pivot end;
each said pedal arm having a reciprocating arcuate travel path about a corresponding said pivot end, comprising a first stroke direction and opposite second stroke direction; and
means for driving the at least one driven wheel in a first direction of rotation during both said first and said second stroke direction of each said pedal arm including:
a left and a right pedal arm each having a pivot end;
each said pedal arm having a reciprocating arcuate travel path about a corresponding said pivot end, comprising a first stroke direction and opposite second stroke direction;
a hub having a left and a right side, disposed within the at least one driven wheel of the pedal driven device;
a first and a second one way drive means disposed to each said side of said hub;
a left and an opposite right tension member for mechanically connecting the corresponding said pedal arm with the corresponding said first and said second one way drive means; and
each said first and said second one way drive means accepting rotary force and engaging with said hub of said at least one driven wheel in a first direction of rotation, and rotating freely and disengaging from said hub of said at least one driven wheel in a second direction of rotation opposite said first direction of rotation, for transmitting power from each said pedal arm to said at least one driven wheel in said first direction of rotation during both said first and said second stroke direction of each said pedal arm by alternatingly rotating each said first and said second one way drive means.

42. In a pedal driven device having a frame and at least one driven wheel, an adjustable pedal drive mechanism, including:
a left and a right pedal arm each having a pivot end;
each said pedal arm having a reciprocating arcuate travel path about a corresponding said pivot end, comprising a first stroke direction and opposite second stroke direction;
means for driving the at least one driven wheel in a first direction of rotation during both said first and said second stroke direction of each said pedal arm; and
means for adjustably positioning said pivot end of each said pedal arm as desired, relative to the frame of the pedal driven device.

43. The adjustable pedal drive mechanism according to claim 42, wherein said means for adjustably positioning said pivot end of each said pedal arm relative to said frame of said pedal driven device, comprises:
a lateral pedal arm plate bushing affixed across the frame;
a left side and an opposite right side pedal arm plate assembly affixed to one another and pivotally secured to the frame through said pedal arm plate bushing;
each said plate assembly including a pedal arm attachment point, and a separate bushing attachment point for pivotally securing each said plate assembly to said pedal arm plate bushing of the frame; and
said pivot end of said left and said right pedal arm being pivotally attached to said pedal arm attachment point respectively of said left and said right plate assembly.

44. In a pedal driven device having a frame and at least one driven wheel, an adjustable pedal drive mechanism, including:
a left and a right pedal arm each having a pivot end;
each said pedal arm having a reciprocating arcuate travel path about a corresponding said pivot end, comprising a first stroke direction and opposite second stroke direction;
means for driving the at least one driven wheel in a first direction of rotation during both said first and said second stroke direction of each said pedal arm; and
intermediate lateral bracing means for each said pedal arm.

45. The adjustable pedal drive mechanism according to claim 44, wherein said intermediate lateral bracing means for each said pedal arm, comprises:
each said pedal arm having a generally intermediately positioned guide shoe disposed thereon;
a left side and an opposite right side pedal arm plate assembly;
each said plate assembly including a pedal arm attachment point and a lower arcuate edge with a pedal arm retainer spaced apart therefrom and extending therealong; and
said pivot end of each said pedal arm being pivotally attached to said pedal arm attachment point of the corresponding said plate assembly, and said guide shoe of each said pedal arm being laterally captured between the corresponding said plate assembly and pedal arm retainer for arcuately moving therebetween and for precluding significant lateral movement of each said pedal arm.

46. The adjustable pedal drive mechanism according to claim 41, further including:

a hub having a left and a right side, disposed within the at least one driven wheel of the pedal driven device;

one way drive means disposed to each said side of said hub;

each said one way drive means rotationally engaging said hub independently of one another;

a left and an opposite right tension member for mechanically connecting the corresponding said pedal arm with the corresponding said one way drive means; and means for increasing travel of each said tension member for each said stroke of each said pedal arm.

47. The adjustable pedal drive mechanism according to claim 46, wherein said means for increasing travel of each said tension member for each said stroke of each said pedal arm, comprises:

each said pedal arm having a first and a second tension member roller thereon, for rotationally connecting the corresponding said tension member to each said pedal arm; and each said tension member passing around said first tension member roller of the corresponding said pedal arm, thence continuing to the corresponding said one way drive means, thence returning and passing around said second tension member roller of the corresponding said pedal arm, for increasing travel of each said tension member when the corresponding said pedal arm is operated.

48. The adjustable pedal drive mechanism according to claim 47, further including means for infinitesimally adjusting the effective stroke length of each said pedal arm relative to the corresponding said pivot end thereof through a predetermined range, by selectively adjusting the position of each said tension member roller along the corresponding said pedal arm.

49. The adjustable pedal drive mechanism according to claim 41, further including:

a hub having a left and a right side, disposed within the at least one driven wheel of the pedal driven device;

one way drive means disposed to each said side of said hub;

each said one way drive means rotationally engaging said hub independently of one another;

a left and an opposite right tension member for mechanically linking the corresponding said pedal arm with the corresponding said one way drive means; and each said one way drive means accepting rotary force and engaging with said hub of the at least one driven wheel in a first direction of rotation, and rotating freely and disengaging from said hub of the at least one driven wheel in a second direction of rotation opposite said first direction of rotation, for independently transmitting power from each said pedal arm to the at least one driven wheel according to selective operation of each said pedal arm as desired.

50. The adjustable pedal drive mechanism according to claim 41, further including means for infinitesimally adjusting the effective mechanical ratio of said first stroke of each said pedal arm through a predetermined range.

51. The adjustable pedal drive mechanism according to claim 41, further including means for infinitesimally adjusting the effective mechanical ratio of said second stroke of each said pedal arm through a predetermined range.

52. The adjustable pedal drive mechanism according to claim 41, further including means for infinitesimally adjusting the effective mechanical ratio of said first and said second stroke of each said pedal arm through predetermined ranges, independently of one another.

53. The adjustable pedal drive mechanism according to claim 41, further including electrically powered means for infinitesimally adjusting the effective mechanical ratio of at least said first and said second stroke of each said pedal arm through predetermined ranges.

54. The adjustable pedal drive mechanism according to claim 53, further including means for remotely controlling said electrically powered ratio adjusting means from the pedal driven device during operation thereof.

55. The adjustable pedal drive mechanism according to claim 41, further including:

a hub having a left and a right side, disposed within the at least one driven wheel of the pedal driven device;

one way drive means disposed to each said side of said hub;

each said one way drive means rotationally engaging said hub independently of one another;

a left and an opposite right tension member for mechanically connecting the corresponding said pedal arm with the corresponding said one way drive means; and means for automatically adjusting each said tension member for compensating for changes in the travel path thereof.

56. The adjustable pedal drive mechanism according to claim 41, including:

a hub having a left and a right side, disposed within the at least one driven wheel of the pedal driven device;

one way drive means disposed to each said side of said hub;

each said one way drive means rotationally engaging said hub independently of one another;

a left and an opposite right tension member for mechanically connecting the corresponding said pedal arm with the corresponding said one way drive means; and each said tension member being selected from the group consisting of roller chains and flexible cables.

57. The adjustable pedal drive mechanism according to claim 41, wherein each said pedal arm includes a selectively extendible and retractable distal portion.

58. The adjustable pedal drive mechanism according to claim 41, further including a stand for supporting the pedal driven device and for using the pedal driven device as a stationary exercise machine.

59. The adjustable pedal drive mechanism according to claim 58, wherein said stand includes means for adjusting for different pedal driven devices having different dimensions from one another.

60. The adjustable pedal drive mechanism according to claim 58, wherein said stand includes means for selectively increasing rotational resistance for the at least one driven wheel of the pedal driven device.

61. A pedal driven device having a frame with a lateral pedal arm plate bushing disposed thereacross, a pedal shaft bushing located on said frame, at least one driven wheel having a hub, an adjustable pedal drive mechanism, and a stationary exercise stand therefor, including in combination:

a left and a right pedal arm extending from said adjustable pedal drive mechanism;

each said pedal arm having a pivot end;

each said pedal arm further having a reciprocating arcuate travel path about a corresponding said pivot end, comprising a first stroke direction and opposite second stroke direction;

said stand having an elongate base with a first end and an opposite second end;

a pair of spaced apart first end braces extending upwardly from said first end of said base, for removably securing said pedal shaft bushing of said pedal driven device therebetween;

a pair of medially disposed supports extending upwardly from said base, for supporting said frame forwardly of said hub of said at least one driven wheel and for holding said at least one driven wheel clear of said base;

a pair of pivotally mounted brake arms extending from said second end of said base of said stand;

each of said brake arms having a distal end opposite said second end of said base of said stand;

a brake drum rotatably disposed between said distal end of each of said brake arms of said stand, for adjustably positioning against said at least one driven wheel of said pedal driven device; and one of:
  means for adjustable positioning said pivot end of each said pedal arm relative to said frame of said device, intermediate lateral bracing means for each said pedal arm, and
  means for driving said at least one driven wheel in a first direction of rotation during both said first and said second stroke direction of each said pedal arm.

62. The pedal driven device, adjustable pedal drive mechanism, and exercise stand combination according to claim 61, wherein said means for adjustably positioning said pivot end of each said pedal arm relative to said frame, comprises:

a left side and an opposite right side pedal arm plate assembly affixed to one another and pivotally secured to said frame through said pedal arm plate bushing;

each said plate assembly including a pedal arm attachment point, and a separate bushing attachment point for pivotally securing each said plate assembly to said pedal arm plate bushing of said frame; and said pivot end of said left and said right pedal arm being pivotally attached to said pedal arm attachment point respectively of said left and said right plate assembly.

63. The pedal driven device, adjustable pedal drive mechanism, and exercise stand combination according to claim 61, wherein said intermediate lateral bracing means for each said pedal arm comprises:

each said pedal arm having a generally intermediately positioned guide shoe disposed thereon;

a left side and an opposite right side pedal arm plate assembly;

each said plate assembly including a pedal arm attachment point and a lower arcuate edge with a pedal arm retainer spaced apart therefrom and extending therealong; and said pivot end of each said pedal arm being pivotally attached to said pedal arm attachment point of the corresponding said plate assembly, and said guide shoe of each said pedal arm being laterally captured between the corresponding said plate assembly and pedal arm retainer for arcuately moving therebetween and for precluding significant lateral movement of each said pedal arm.

64. The pedal driven device, adjustable pedal drive mechanism, and exercise stand combination according to claim 61, wherein said means for driving said at least one driven wheel in a first direction of rotation during both said first and said second stroke direction of each said pedal arm, comprises:

a hub having a left and a right side, disposed within said at least one driven wheel of the pedal driven device;

a first and a second one way drive means disposed to each said side of said hub;

a left and an opposite right tension member for mechanically connecting the corresponding said pedal arm with the corresponding said first and said second one way drive means; and each said first and said second one way drive means accepting rotary force and engaging with said hub of said at least one driven wheel in a first direction of rotation, and rotating freely and disengaging from said hub of said at least one driven wheel in a second direction of rotation opposite said first direction of rotation, for transmitting force from each said pedal arm to said at least one driven wheel in said first direction of rotation during both said first and said second stroke direction of each said pedal arm by alternatingly rotating each said first and said second one way drive means.

65. The pedal driven device, adjustable pedal drive mechanism, and exercise stand combination according to claim 61 further including:

a hub having a left and a right side, disposed within said at least one driven wheel of the pedal driven device;

one way drive means disposed to each said side of said hub;

each said one way drive means rotationally engaging said hub independently of one another;

a left and an opposite right tension member for mechanically connecting the corresponding said pedal arm with the corresponding said one way drive means; and means for increasing travel of each said tension member for each said stroke of each said pedal arm.

66. The pedal driven device, adjustable pedal drive mechanism, and exercise stand combination according to claim 65, wherein said means for increasing travel of each said tension member for each said stroke of each said pedal arm, comprises:

each said pedal arm having a first and a second tension member roller thereon, for rotationally connecting the corresponding said tension member to each said pedal arm; and each said tension member passing around said first tension member roller of the corresponding said pedal arm, continuing to the corresponding said one way drive means, thence returning and passing around said second tension member roller of the corresponding said pedal arm, for increasing travel of each said tension member when the corresponding said pedal arm is operated.

67. The pedal driven device, adjustable pedal drive mechanism, and exercise stand combination according to claim 66, further including means for infinitesimally adjusting the effective stroke length of each said pedal arm relative to the corresponding said pivot end thereof through a predetermined range, by selectively adjusting the position of each said tension member roller along the corresponding said pedal arm.

68. The pedal driven device, adjustable pedal drive mechanism, and exercise stand combination according to claim 61 further including:

a hub having a left and a right side, disposed within said at least one driven wheel of said pedal driven device;

one way drive means disposed to each said side of said hub;

each said one way drive means rotationally engaging said hub independently of one another;

a left and an opposite right tension member for mechanically linking the corresponding said pedal arm with the corresponding said one way drive means; and each said one way drive means accepting rotary force and engaging with said hub of said at least one driven wheel in a first direction of rotation, and rotating freely and disengaging from said hub of said at least one driven wheel in a second direction of rotation opposite said first direction of rotation, for independently transmitting power from each said pedal arm to said at least one driven wheel according to selective operation of each said pedal arm as desired.

69. The pedal driven device, adjustable pedal drive mechanism, and exercise stand combination according to claim 61, further including means for infinitesimally adjusting the effective mechanical ratio of said first stroke of each said pedal arm through a predetermined range.

70. The pedal driven device, adjustable pedal drive mechanism, and exercise stand combination according to claim 61, further including means for infinitesimally adjusting the effective mechanical ratio of said second stroke of each said pedal arm through a predetermined range.

71. The pedal driven device, adjustable pedal drive mechanism, and exercise stand combination according to claim 61, further including means for infinitesimally adjusting the effective mechanical ratio of said first and said second stroke of each said pedal arm through predetermined ranges, independently of one another.

72. The pedal driven device, adjustable pedal drive mechanism, and exercise stand combination according to claim 61, further including electrically powered means for infinitesimally adjusting the effective mechanical ratio of at least said first and said second stroke of each said pedal arm through predetermined ranges.

73. The pedal driven device, adjustable pedal drive mechanism, and exercise stand combination according to claim 72, further including means for remotely controlling said electrically powered ratio adjusting means from the pedal driven device during operation thereof.

74. The pedal driven device, adjustable pedal drive mechanism, and exercise stand combination according to claim 61, further including:

a hub having a left and a right side, disposed within the at least one driven wheel of the pedal driven device;

one way drive means disposed to each said side of said hub;

each said one way drive means rotationally engaging said hub independently of one another;

a left and an opposite right tension member for mechanically connecting the corresponding said pedal arm with the corresponding said one way drive means; and means for automatically adjusting each said tension member for compensating for changes in the travel path thereof.

75. The pedal driven device, adjustable pedal drive mechanism, and exercise stand combination according to claim 61, further including:

a hub having a left and a right side, disposed within the at least one driven wheel of the pedal driven device;

one way drive means disposed to each said side of said hub;

each said one way drive means rotationally engaging said hub independently of one another;

a left and an opposite right tension member for mechanically connecting the corresponding said pedal arm with the corresponding said one way drive means; and each said tension member being selected from the group consisting of roller chains and flexible cables.

76. The adjustable pedal drive mechanism according to claim 61, wherein each said pedal arm includes a selectively extendible and retractable distal portion.

77. In a pedal driven device having a frame and at least one driven wheel, an adjustable pedal drive mechanism, including:

a left and a right pedal arm each having a pivot end;

each said pedal arm having a reciprocating arcuate travel path about a corresponding said pivot end, comprising a first stroke direction and opposite second stroke direction;

means for adjustably positioning said pivot end of each said pedal arm as desired, relative to the frame of the device; and means for infinitesimally adjusting the effective mechanical ratio of at least one of said first and said second stroke of each said pedal arm through predetermined ranges.

78. The adjustable pedal drive mechanism according to claim 77, wherein said means for infinitesimally adjusting the effective mechanical ratio is electrically powered.

79. The adjustable pedal drive mechanism according to claim 78, further including means for remotely controlling said electrically powered ratio adjusting means from the pedal driven device during operation thereof.

80. In a pedal driven device having a frame and at least one driven wheel, an adjustable pedal drive mechanism, including:

a left and a right pedal arm each having a pivot end;

each said pedal arm having a reciprocating arcuate travel path about a corresponding said pivot end, comprising a first stroke direction and opposite second stroke direction;

intermediate lateral bracing means for each said pedal arm; and means for infinitesimally adjusting the effective mechanical ratio of at least one of said first and said second stroke of each said pedal arm through predetermined ranges.

81. The adjustable pedal drive mechanism according to claim 80, wherein said means for infinitesimally adjusting the effective mechanical ratio is electrically powered.

82. The adjustable pedal drive mechanism according to claim 81, further including means for remotely controlling said electrically powered ratio adjusting means from the pedal driven device during operation thereof.

83. In a pedal driven device having a frame and at least one driven wheel, an adjustable pedal drive mechanism, including:

a left and a right pedal arm each having a pivot end;

each said pedal arm having a reciprocating arcuate travel path about a corresponding said pivot end, comprising a first stroke direction and opposite second stroke direction;

means for driving the at least one driven wheel in a first direction of rotation during both said first and said second stroke direction of each said pedal arm; and means for infinitesimally adjusting the effective mechanical ratio of at least one of said first and said second stroke of each said pedal arm through predetermined ranges.

84. The adjustable pedal drive mechanism according to claim 83, wherein said means for infinitesimally adjusting the effective mechanical ratio is electrically powered.

85. A pedal driven device having a frame with a lateral pedal arm plate bushing disposed thereacross, a pedal shaft bushing located on said frame, at least one driven wheel having a hub, an adjustable pedal drive mechanism, and a stationary exercise stand therefor, including in combination:

a left and a right pedal arm extending from said adjustable pedal drive mechanism;

each said pedal arm having a pivot end;

each said pedal arm further having a reciprocating arcuate travel path about a corresponding said pivot end, comprising a first stroke direction and opposite second stroke direction;

said stand having an elongate base with a first end and an opposite second end;

a pair of spaced apart first end braces extending upwardly, from said first end of said base, for removably securing said pedal shaft bushing of said pedal driven device therebetween;

a pair of medially disposed supports extending upwardly from said base, for supporting said frame forwardly of said hub of said at least one driven wheel and for holding said at least one driven wheel clear of said base;

a pair of pivotally mounted brake arms extending from said second end of said base of said stand;

each of said brake arms having a distal end opposite said second end of said base of said stand;

a brake drum rotatably disposed between said distal end of each of said brake arms of said stand, for adjustably positioning against said at least one driven wheel of said pedal driven device; and means for infinitesimally adjusting the effective mechanical ratio of at least one of said first and said second stroke of each said pedal arm through predetermined ranges.

86. The adjustable pedal drive mechanism according to claim 85, wherein said means for infinitesimally adjusting the effective mechanical ratio is electrically powered.

* * * * *